United States Patent [19]
Togino

[11] Patent Number: 6,147,808
[45] Date of Patent: Nov. 14, 2000

[54] DECENTERED IMAGE-FORMING OPTICAL SYSTEM

[75] Inventor: Takayoshi Togino, Hachioji, Japan

[73] Assignee: Olympus Optical Co., Ltd., Tokyo, Japan

[21] Appl. No.: 09/330,620

[22] Filed: Jun. 11, 1999

[30] Foreign Application Priority Data

Jun. 24, 1998 [JP] Japan .................................. 10-177614

[51] Int. Cl.[7] .................................................. G02B 27/14
[52] U.S. Cl. ......................... 359/637; 359/631; 359/633
[58] Field of Search .................................. 359/630, 631, 359/633, 637, 640

[56] References Cited

U.S. PATENT DOCUMENTS

| | | | |
|---|---|---|---|
| 5,699,194 | 12/1997 | Takahashi | 359/633 |
| 5,701,202 | 12/1997 | Takahashi | 359/631 |
| 5,745,295 | 4/1998 | Takahashi | 359/631 |
| 5,751,494 | 5/1998 | Takahashi | 359/631 |

OTHER PUBLICATIONS

European Abstract, Dialog(R)File 352: Derwent WPI, 1999, No. 010534976, Japanese Patent Pub. 7–333551 Jun. 1994, EPA 687932 Abst Dec. 1995.
European Abstract, Dialog(R)File 32: Derwent WPI, 1999, No. 011965452, Japanese Patent Pub. 10–153748 Jun. 1998.
European Abstract, Dialog(R)File 352: Derwent WPI, 1999, No. 010585485, Japanese Patent Pub. 07–333505 Dec. 1995.
Patent Abstracts of Japan, Pub. No. 08–292,368 Nov. 1996.
Patent Abstracts of Japan, Pub. No. 08–292,371 Nov. 1996.
Patent Abstracts of Japan, Pub. No. 08–292,372 Nov. 1996.
European Abstract, Dialog(R)File 352: Derwent WPI, 1999, No. 011144717, Japanese Patent Pub. 09–005650 Jan. 1997.
European Abstract, Dialog(R)File 352: Derwent WPI, 1999, No. 011662889, Japanese Patent Pub. 09–090229 Apr. 1997.
European Abstract, Dialog(R)File 352: Derwent WPI, 1999, No. 011459296, Japanese Patent Pub. 09–211331 Jan. 1996.
European Abstract, Dialog(R)File 352: Derwent WPI, 1999 No. 011426976, Japanese Patent Pub. 09–222561 Feb. 1996.
European Abstract, Dialog(R)File 352: Derwent WPI, 1999, No. 011498469, Japanese Patent Pub. 09–222563 Aug. 1997, EP 790513 Abst Aug. 1997.
European Abstract, Dialog(R)File 352: Derwent WPI, 1999, No. 011529109, Japanese Patent Pub. 09–258105 Mar. 1996.
European Abstract, Dialog(R)File 352: Derwent WPI, 1999, No. 011529109, Japanese Patent Pub. 09–258106 Mar. 1993, EP 802436 A2 Oct. 1997.
European Abstract, Dialog(R)File 352: Derwent WPI, 1999, No. 011426976, Japanese Patent Pub. 10–020196 Jul. 1996, EP 790513 A2 Aug. 1997.

*Primary Examiner*—Ricky Mack
*Attorney, Agent, or Firm*—Pillsbury Madison & Sutro LLP

[57] ABSTRACT

A high-performance image-forming optical system made compact and thin by folding an optical path using reflecting surfaces arranged to minimize the number of reflections. The image-forming optical system has a first prism placed on the object side and a second prism placed on the image side and does not form an intermediate image. The first prism has a first surface through which a light beam from an object enters the first prism, and a second surface that reflects the light beam entering through the first surface in the first prism. The first surface also reflects the light beam reflected by the second surface in the first prism. The first prism further has a third surface through which the light beam reflected by the first surface exits from the first prism. The first or second surface has a rotationally asymmetric surface configuration that gives a power to a light beam. The second prism has at least one reflecting surface that reflects a light beam in the second prism. The reflecting surface has a rotationally asymmetric surface configuration that gives a power to a light beam and corrects aberrations due to decentration.

23 Claims, 16 Drawing Sheets

DECENTERED IMAGE-FORMING OPTICAL SYSTEM

BACKGROUND OF THE INVENTION

1. Field of the Invention

The present invention relates to image-forming optical systems. More particularly, the present invention relates to a decentered optical system with a reflecting surface having a power for use in optical apparatuses using a small-sized image pickup device, e.g. video cameras, digital still cameras, film scanners, and endoscopes.

2. Discussion of Related Art

Recently, with the achievement of small-sized image pickup devices, image-forming optical systems for use in video cameras, digital still cameras, film scanners, endoscopes, etc. have also been required to be reduce in size and weight and also in cost.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration, and folding an optical path in the optical axis direction.

Japanese Patent Application Unexamined Publication Number [hereinafter referred to as "JP(A)"] 7-333505 proposes to reduce the thickness of an optical system by giving a power to a decentered reflecting surface and folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size in conformity to the Leica size film format. Accordingly, the prisms themselves become unavoidably large in size. Furthermore, because the disclosed zoom lens systems are not telecentric on the image side, it is difficult to apply them to image pickup devices such as CCDs. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is twice as high as that in the case of a refracting surface, and as the number of reflections increases, decentration errors may be transmitted additively. Consequently, manufacturing accuracy and assembly accuracy, e.g. surface accuracy and decentration accuracy, requirements for reflecting surfaces become even more strict.

SUMMARY OF THE INVENTION

In view of the above-described problems of the prior art, an object of the present invention is to provide a high-performance and low-cost image-forming optical system having a minimal number of constituent optical elements.

Another object of the present invention is to provide a high-performance image-forming optical system that is made compact and thin by folding an optical path using reflecting surfaces arranged to minimize the number of reflections.

To attain the above-described objects, the present invention provides an image-forming optical system having a positive refracting power as a whole for forming an object image. The image-forming optical system has a first prism and a second prism, which are each formed from a above-described objects, has a first prism and a second prism, which are each formed from a medium having a refractive index (n) larger than 1.3 (n>1.3). The second prism is placed on the image side of the first prism. The image-forming optical system does not form an intermediate image.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting medium having a refractive index (n) larger than 1.3 (n>1.3). The second prism is placed on the image side of the first prism. The image-forming optical system does not form an intermediate image. The first prism has three optical surfaces that transmit or reflect a light beam. The three optical surfaces include a first surface through which a light beam from an object enters the first prism, and a second surface that reflects the light beam entering through the first surface in the first prism. The first surface also reflects the light beam reflected by the second surface in the first prism. The other of the three optical surfaces is a third surface through which the light beam reflected by the first surface exits from the first prism. At least one of the first and second surfaces has a curved surface configuration that gives a power to a light beam. The curved surface configuration has a rotationally asymmetric surface configuration that corrects aberrations due to decentration. The second prism has at least one reflecting surface that reflects a light beam in the second prism. The reflecting surface has a rotationally asymmetric surface configuration that gives a power to a light beam and corrects aberrations due to decentration.

The reasons for adopting the above-described arrangement in the present invention, together with the function thereof, will be described below in order.

The first image-forming optical system according to the present invention, which is provided to attain the optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit and do not need high assembly accuracy and a large number of man-hours for adjustment such as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which two prisms are provided to obtain a satisfactory symmetry with respect to the stop, thereby enabling not only axial aberrations but also off-axis aberrations to be favorably corrected. If only one prism is provided, asymmetry with respect to the stop is enhanced, and off-axis aberrations are unavoidably aggravated.

For the reasons stated above, the present invention adopts a basic arrangement in which the image-forming optical system has a first prism and a second prism placed on the image side of the first prism and does not form an intermediate image. In addition, it is desirable that the image-forming optical system should be approximately telecentric on the image side.

Next, the arrangement of an image-forming optical system that is approximately telecentric on the image side will be described in detail.

As has been stated above, reflecting surfaces have a high decentration error sensitivity in comparison to refracting surfaces. Therefore, it is desirable to provide an arrangement of an optical system that is as independent of the high decentration error sensitivity as possible. In the case of a general coaxial optical system arranged to be approximately telecentric on the image side, because extra-axial principal rays are approximately parallel to the optical axis, the positional accuracy of the extra-axial rays is satisfactorily maintained on the image plane even if defocusing is effected. Therefore, the image-forming optical system according to the present invention is arranged to reflect the property of the above-described arrangement. In particular, to prevent the performance of an optical system using a reflecting surface, which has a relatively high decentration error sensitivity, from being deteriorated by focusing, it is desirable to adopt an arrangement in which the optical system is approximately telecentric on the image side, whereby the positional accuracy of extra-axial rays is maintained favorably.

Such an arrangement enables the present invention to be suitably applied to an image pickup optical system using an image pickup device, e.g. a CCD, in particular. Adopting the above-described arrangement minimizes the influence of the cosine fourth law. Accordingly, it is also possible to reduce shading.

As has been stated above, adopting the basic arrangement of the present invention makes it possible to obtain a compact image-forming optical system that has a smaller number of constituent optical elements than in the case of a refracting optical system and exhibits favorable performance throughout the image field, from the center to the periphery thereof.

The first prism in the present invention has three optical surfaces that transmit or reflect a light beam. Of the three optical surfaces, a first surface allows a light beam from an object to enter the first prism through the first surface. A second surface reflects the light beam entering through the first surface in the first prism. The first surface also reflects the light beam reflected by the second surface in the first prism. A third surface allows the light beam reflected by the first surface to exit from the first prism through the third surface. At least one of the first and second surfaces has a curved surface configuration that gives a power to a light beam. The curved surface configuration has a rotationally asymmetric surface configuration that corrects aberrations due to decentration.

When a light ray from the object center that passes through the center of the stop and reaches the center of the image plane is defined as an axial principal ray, it is desirable that at least one of the reflecting surfaces should be decentered with respect to the axial principal ray. If at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one of the surfaces constituting a prism used in the present invention should be a rotationally asymmetric surface. It is particularly preferable from the viewpoint of aberration correction that at least one reflecting surface should be a rotationally asymmetric surface.

The reasons for adopting the above-described arrangements in the present invention will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the image-forming optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 22, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 23, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 24, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses a rotationally asymmetric surface.

$$\sum_{j=2}^{66} C_j X^m Y^n = C_2 X + C_3 Y + C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 +$$
$$C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 +$$
$$C_{23} X^5 Y + C_{24} X^4 Y^2 + C_{25} X^3 Y^3 + C_{26} X^2 Y^4 +$$
$$+ C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 +$$
$$C_{35} XY^6 + C_{36} Y^7 \ldots$$

where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z- axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:
c: the curvature at the vertex
k: a conic constant $r = \sqrt{(X^2 + Y^2)}$ The free-form surface term is given by Incidentally, when the first prism is of the type in which the second reflecting surface and the first transmitting surface are formed from a single surface serving as both reflecting and transmitting surfaces as stated above, the first reflecting surface reflects incident rays toward the second reflecting surface at a minimal angle of deviation, and the second reflecting surface bends the rays to a considerable extent. Therefore, it is possible to reduce the thickness of the prism in the direction of the incident rays.

In addition, by giving a negative refracting power to the first prism, a wide field angle for imaging can be obtained. This is because the negative power enables rays of wide field angle to be converged and thus it is possible to converge the light beam when the rays enter the second unit, which is formed from the second prism. This is favorable from the viewpoint of aberration correction when an optical system having a relatively short focal length is to be constructed.

In a case where the first prism is arranged as stated above, it is preferable that the first reflecting surface should have a negative power. By doing so, it becomes possible to lengthen the optical path length along the optical axis between the first reflecting surface and a surface of the second prism that has a positive power. Accordingly, it is possible to weaken the positive and negative powers and hence possible to reduce aberrations produced by these surfaces.

It is preferable to place the stop on the image side of the first prism. By doing so, in a case where the first reflecting surface has a negative power and is approximated by a spherical surface, the center of curvature of the first reflecting surface and the stop position are approximately coincident with each other. Therefore, it is possible to eliminate comatic aberration in theory.

Accordingly, both the first and second surfaces of the first prism may be arranged to have a rotationally asymmetric surface configuration that gives a power to a light beam and corrects aberrations due to decentration.

Furthermore, the rotationally asymmetric surface configuration of at least one of the first and second surfaces of the first prism may be arranged in the form of a plane-symmetry free-form surface having only one plane of symmetry.

Furthermore, the rotationally asymmetric surface configurations of both the first and second surfaces of the first prism may be arranged in the form of a plane-symmetry free-form surface having only one plane of symmetry.

In this case, the first prism may be arranged such that the only one plane of symmetry of the plane-symmetry free-form surface that forms the first surface of the first prism and the only one plane of symmetry of the plane-symmetry free-form surface that forms the second surface of the first prism are formed in the same plane.

The first prism may also be arranged such that the third surface thereof has a rotationally asymmetric surface configuration that gives a power to a light beam and corrects aberrations due to decentration. A refracting surface having such a surface configuration is effective in correcting aberrations due to decentration.

In this case, the rotationally asymmetric surface configuration of the third surface of the first prism may be arranged in the form of a plane-symmetry free-form surface having only one plane of symmetry.

Furthermore, a rotationally asymmetric surface placed in the second prism may be arranged in the form of a plane-symmetry free-form surface having only one plane of symmetry.

In this case, it is desirable to arrange the first and second prisms so that the only one plane of symmetry of at least one plane-symmetry free-form surface in the first prism and that of at least one plane-symmetry free-form surface in the second prism are placed in the same plane.

In the present invention, the effective way of enhancing the symmetry required for the image-forming optical system and thereby favorably correcting aberrations, including off-axis aberrations, is to place a pupil between the first and second prisms and to place the second prism between the pupil and the image plane.

In this case, it is desirable to place the stop on the pupil.

In the present invention, the second prism may be arranged to have two or more reflecting surfaces with a curved surface configuration that gives a power to a light beam.

In the present invention, the second prism may be formed from three optical surfaces, i.e. an entrance surface serving as both a reflecting surface and a transmitting surface, a reflecting surface, and an exit surface.

This is the same prism configuration as that of the first prism. In this type of prism, the second reflecting surface and the first transmitting surface are formed from a single surface serving as both reflecting and transmitting surfaces. The second reflecting surface bends rays to a considerable extent. The first reflecting surface reflects rays toward the second reflecting surface at a minimal angle of deviation. Therefore, it is possible to reduce the thickness of the prism optical system in the direction of the incident rays.

It is preferable to give a positive power to the first reflecting surface of the second prism. By doing so, favorable aberration correction can be performed. The reason for this is that giving a power to the first reflecting surface, which has a small deviation angle of rays, means giving a power to a surface that produces minimal decentration aberrations. It is preferable to give a negative power to the second reflecting surface. By doing so, it becomes possible to move the principal point of the second prism to a position on the object side of the prism and hence possible to shorten the back focus of the second prism.

In the present invention, the second prism may be formed from three optical surfaces, i.e. a reflecting surface that gives a power to a light beam, an entrance surface, and an exit surface.

In this case, there is only one reflection. Accordingly, the second prism needs only one reflecting surface, which requires particularly high accuracy. Therefore, the arrangement is advantageous from the viewpoint of production.

It is preferable to give a positive power to the reflecting surface. This is because the amount of aberration produced from a reflecting surface provided with a positive power is favorably smaller than in the case of a transmitting surface provided with a power.

In the present invention, the second prism may be formed from four optical surfaces, i.e. two reflecting surfaces that give a power to a light beam, an entrance surface, and an exit surface.

The above-described prism configuration of the second prism enables an increase in the degree of freedom for aberration correction and produces minimal aberrations. In addition, because the relative decentration between the two reflecting surfaces is small, aberrations produced by the two reflecting surfaces are corrected with these reflecting surfaces by canceling the aberrations each other. Therefore, the amount of aberration produced in the prism is favorably small. It is more desirable that the two reflecting surfaces should have powers of different signs. By doing so, it is possible to enhance the effect of correcting each other's aberrations by the two reflecting surfaces and hence possible to obtain high resolution.

It is preferable to minimize the relative decentration between the first and second reflecting surfaces at points where the optical axis is reflected by the two reflecting surfaces. By doing so, it becomes possible to reduce the amount of decentration aberrations produced from the second prism, and the amount of rotationally asymmetric aberrations produced from the second prism reduces.

In the present invention, the second prism may be formed from three optical surfaces, i.e. an entrance surface, an exit surface serving as both a reflecting surface and a transmitting surface, and a reflecting surface that gives a power to a light beam.

In this type of prism, the first reflecting surface and the second transmitting surface are formed from a single surface serving as both reflecting and transmitting surfaces. The first reflecting surface bends rays to a considerable extent. The second reflecting surface reflects rays toward the second transmitting surface at a minimal angle of deviation. Therefore, it is possible to reduce the thickness of the optical system in the vertical direction with respect to the optical axis of the incident rays.

In addition, because a positive power can be given to the second reflecting surface, which has a minimal angle of deviation, it is possible to place the principal point of the second prism at a position on the image side of the prism and hence possible to lengthen the back focus of the second prism. This arrangement is favorable for use in a case where a filter or the like is placed immediately in front of the image-formation plane.

In the present invention, the second prism may be formed from three reflecting surfaces. One of the reflecting surfaces also serves as a transmitting surface to form an entrance surface. Another of the reflecting surfaces also serves as a transmitting surface to form an exit surface.

This type of prism is formed from three surfaces and has three reflecting surfaces. Therefore, the power required for the prism can be distributed to the three reflecting surfaces. Accordingly, the amount of aberration produced in the prism can be reduced. In addition, because portions of the optical path intersect each other in the prism, the optical path length can be made long in comparison to a prism structure in which the optical path is simply folded.

When the second prism adopts the above-described prism structure, a positive power can be given to the second reflecting surface, which has a minimal angle of deviation. Therefore, a surface having the principal power can be placed at a position of relatively long optical path length from the second transmitting surface of the second prism. Therefore, the back focus can be reduced.

It should be noted that in each optical surface having both transmitting and reflecting actions in the prisms according to the present invention, the reflecting action should desirably be total reflection. If the condition for total reflection is not satisfied, the optical surface cannot have both reflecting and transmitting actions, and it becomes difficult to reduce the size of the prism.

In addition, reflecting surfaces other than the totally reflecting surface are preferably formed from a reflecting surface having a thin film of a metal, e.g. aluminum or silver, formed on the surface thereof, or a reflecting surface formed from a dielectric multilayer film. In the case of a metal thin film having reflecting action, a high reflectivity can be readily obtained. The use of a dielectric reflecting film is advantageous in a case where a reflecting film having wavelength selectivity or minimal absorption is to be formed.

Thus, it is possible to obtain a low-cost and compact image-forming optical system in which the prism manufacturing accuracy is favorably eased.

In the present invention, it is desirable for the image-forming optical system to have a first prism having a diverging action on the object side of the stop and a second prism having a converging action on the image side of the stop, and also desirable for the image-forming optical system to be approximately telecentric on the image side.

In an image-forming optical system using a refracting optical element, the power distribution varies according to the application. For example, telephoto systems having a narrow field angle generally adopt an arrangement in which the entire system is formed as a telephoto type having a positive front unit and a negative rear unit, thereby making the overall length of the optical system shorter than the focal length. Wide-angle systems having a wide field angle generally adopt an arrangement in which the entire system is formed as a retrofocus type having a negative front unit and a positive rear unit, thereby making the back focus longer than the focal length.

In the case of an image-forming optical system using an image pickup device, e.g. a CCD, in particular, it is necessary to place an optical low-pass filter or an infrared cutoff filter between the image-forming optical system and the image pickup device to remove moire or to eliminate the influence of infrared rays. Therefore, with a view to ensuring a space for placing these optical members, it is desirable to adopt a retrofocus type arrangement for the image-forming optical system.

It is important for a retrofocus type image-forming optical system to be corrected for aberrations, particularly off-axis aberrations. The correction of off-axis aberrations depends largely on the position of the stop. As has been stated above, in the case of a general coaxial optical system, off-axis aberrations are aggravated if optical elements are not in symmetry with respect to the stop. For this reason, the common practice is to place optical elements of the same sign at respective positions facing each other across the stop, thereby obtaining a satisfactory symmetry with respect to the stop, and thus correcting off-axis aberrations. In the case of a retrofocus type system having a negative front unit and a positive rear unit, the power distribution is asymmetric in the first place. Therefore, the off-axis aberration-correcting performance varies to a considerable extent according to the position of the stop.

Therefore, the stop is placed between the object-side, first prism having a diverging action and the image-side, second prism having a converging action, thereby making it possible to minimize the aggravation of off-axis aberrations due to the asymmetry of the power distribution. If the stop is placed on the object side of the object-side diverging prism or on the image side of the image-side converging prism, the asymmetry with respect to the stop is enhanced and becomes difficult to correct.

In this case, the image-forming optical system may consist of the first prism of diverging action placed on the object side of the stop and the second prism of converging action placed on the image side of the stop. That is, the image-forming optical system may be formed from these prisms alone.

In the image-forming optical systems according to the present invention, there is only one image-formation plane throughout the system. As has been stated above, the decentration error sensitivity of a reflecting surface is higher than that of a refracting surface. In a reflecting optical member arranged in the form of a single block as in the case of a prism, surface accuracy errors and decentration errors of each surface are transferred while being added up. Therefore, the smaller the number of reflecting surfaces, the more the manufacturing accuracy required for each surface is eased. Accordingly, it is undesirable to increase the number of reflections more than is needed. For example, in an image-forming optical system in which an intermediate image is formed and this image is relayed, the number of reflections increases more than is needed, and the manufacturing accuracy required for each surface becomes tight, causing the cost to increase unfavorably.

In the image-forming optical system according to the present invention, focusing of the image-forming optical system can be effected by moving all the constituent elements or moving only one prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the image-forming optical system according to the present invention, if at least one prism is formed by using an organic material such as a plastic material, the cost can be reduced. It is desirable to use a material of low moisture absorption, such as amorphous polyolefin, because such a material has a minimum change in image-forming performance with changes in moisture.

In the present invention, temperature compensation can be made by using a diverging prism and a converging prism. By providing the prisms with powers of different signs, it is possible to prevent the focal shift due to changes in temperature, which is a problem arising when a plastic material is used to form a prism.

In the present invention, it is desirable that each of a plurality of prisms should have a positioning portion for setting a relative position, which is provided on a surface having no optical action. In a case where a plurality of prisms each having a reflecting surface with a power are provided as in the present invention in particular, relative displacement of each prism causes the performance to be deteriorated. Therefore, in the present invention, a positioning portion for setting a relative position is provided on each surface of each prism that has no optical action, thereby ensuring the required positional accuracy. Thus, the desired performance can be ensured. In particular, if a plurality of prisms are integrated into one unit by using the positioning portions and coupling members, it becomes unnecessary to assemble and adjust a plurality of prisms which would otherwise be separate from each other. Accordingly, the cost can be further reduced.

Furthermore, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from prisms alone. By doing so, the number of components is reduced, and the cost is lowered. Furthermore, a plurality of prisms may be integrated into one prism at each of the front and back sides of the stop. By doing so, the cost can be further reduced.

In the present invention, the image-forming optical system may include another lens (positive or negative lens) as a constituent element in addition to the first and second prisms at one or each of a plurality of positions selected from a position on the object side of the first and second prisms, a position between the two prisms, and a position on the image side of the two prisms.

The image-forming optical system according to the present invention may be a fast, single focal length lens system. Alternatively, the image-forming optical system may be arranged in the form of a zoom lens system (variable-magnification image-forming optical system) by combining it with a single or plurality of refracting optical systems that may be provided between the two prisms or on the object or image side of the two prisms.

In the present invention, the refracting and reflecting surfaces of the image-forming optical system may be formed from spherical surfaces or rotationally symmetric aspherical surfaces.

In a case where the above-described image-forming optical system according to the present invention is placed in an image pickup part of an image pickup apparatus, or in a case where the image pickup apparatus is a photographic apparatus having a camera mechanism, it is possible to adopt an arrangement in which a prism member provided in the front unit is placed closest to the object side among optical elements having an optical action, and the entrance surface of the prism member is decentered with respect to the optical axis, and further a cover member is placed on the object side of the prism member at right angles to the optical axis. The arrangement may also be such that the prism member provided in the front unit has on the object side thereof an entrance surface decentered with respect to the optical axis, and a cover lens having a power is placed on the object side of the entrance surface of the prism member in coaxial relation to the optical axis so as to face the entrance surface across an air spacing.

If a prism member is placed closest to the object side and a decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

A finder optical system can be formed by using any of the above-described image-forming optical systems according to the present invention as a finder objective optical system and adding an image-inverting optical system for erecting an object image formed by the finder objective optical system and an ocular optical system.

In addition, it is possible to construct a camera apparatus by using the finder optical system and an objective optical system for photography provided in parallel to the finder optical system.

In addition, an image pickup optical system can be constructed by using any of the foregoing image-forming optical systems according to the present invention and an image pickup device placed in an image plane formed by the image-forming optical system.

In addition, a camera apparatus can be constructed by using any of the foregoing image-forming optical systems according to the present invention as an objective optical system for photography, and a finder optical system placed in an optical path separate from an optical path of the objective optical system for photography or in an optical path branched from the optical path of the object optical system for photography.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 10 of the image-forming optical system according to the present invention will be described below. It should be noted that constituent parameters of each example will be shown later.

Figure 1:
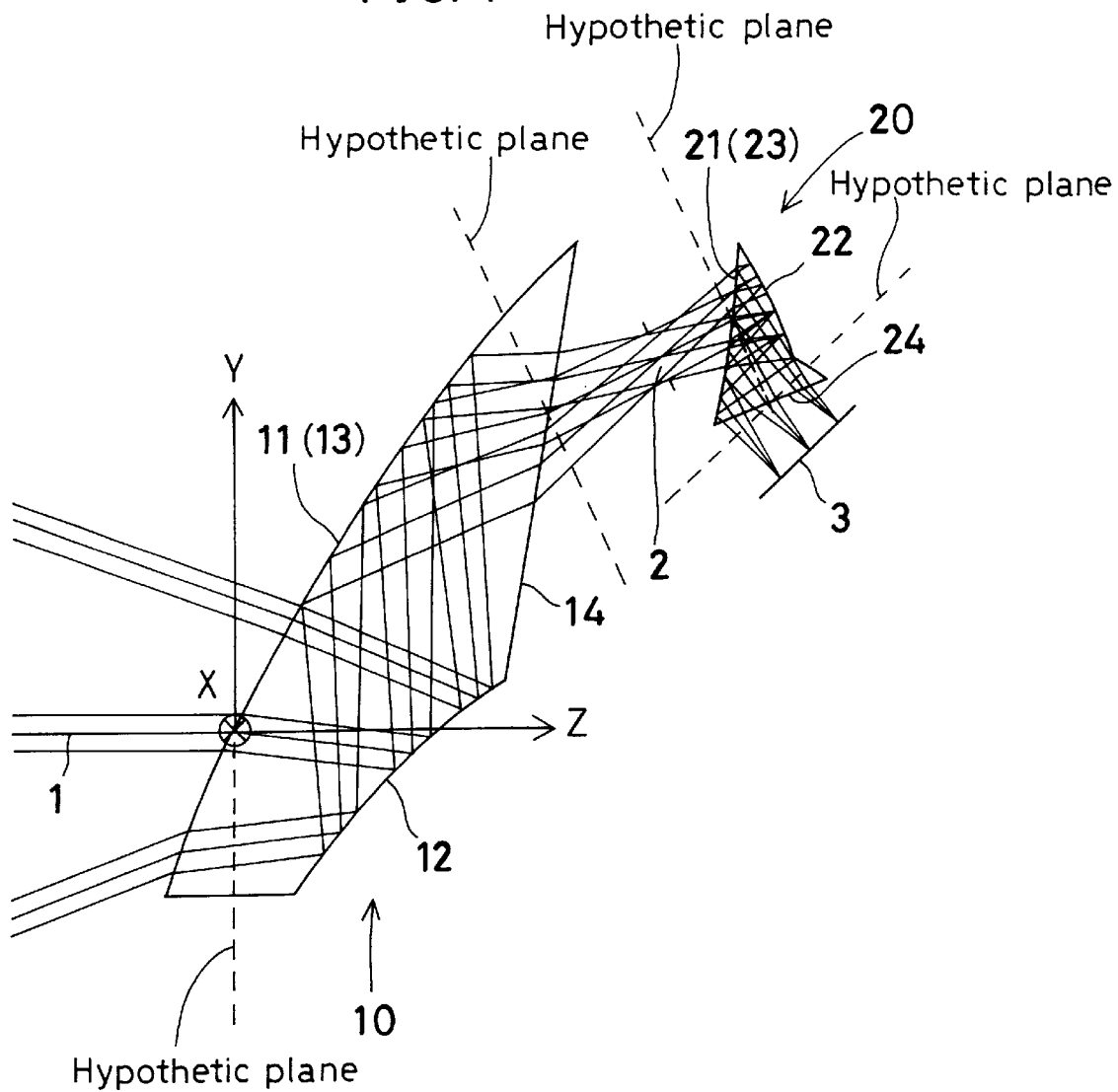
FIG. 1 is a sectional view of an image-forming optical system according to Example 1 of the present invention.

In each example, as shown in FIG. 1, an axial principal ray 1 is defined by a ray emanating from the center of an object and passing through the center of a stop 2 to reach the center of an image plane 3. A hypothetic plane is taken in the plane extending through the intersection between the axial principal ray 1 and the entrance surface (first surface) 11 of the first prism 10 at right angles to the axial principal ray 1 entering the entrance surface 11. Another hypothetic plane is taken in the plane extending through the intersection between the axial principal ray 1 and the exit surface (fourth surface) 14 of the first prism 10 at right angles to the axial principal ray 1 exiting from the exit surface 14. Another hypothetic plane is taken in the plane extending through the intersection between the axial principal ray 1 and the entrance surface (first surface) 21 of the second prism 20 at right angles to the axial principal ray 1 entering the entrance surface 21. Another hypothetic plane is taken in the plane extending through the intersection between the axial principal ray 1 and the exit surface (fourth surface) 24 of the second prism 20 at right angles to the axial principal ray 1 exiting from the exit surface 24. The intersection of each hypothetic plane and the associated optical surface is defined as the origin for this optical surface and the decentered optical surfaces present between it and the subsequent hypothetic plane (the image plane in the case of the final hypothetic plane). A positive direction of a Z-axis is taken in the direction of travel of the axial principal ray 1 (the axial principal ray 1 entering the entrance surface in the case of the hypothetic plane determined with respect to the intersection of each entrance surface; the axial principal ray 1 exiting from the exit surface in the case of the hypothetic plane determined with respect to the intersection of each exit surface). A plane containing the Z-axis and the center of the image plane is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. FIG. 1 shows the hypothetic planes and a coordinate system concerning the hypothetic plane determined with respect to the intersection of the entrance surface 11 of the first prism 10. Illustration of the hypothetic planes and the coordinate system is omitted in FIG. 2 and the subsequent figures.

In Example 1 to 10, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface (including a hypothetic plane) and a surface subsequent thereto are given a surface separation when these surfaces form a coaxial optical system. In addition, the refractive index and Abbe's number of each medium are given according to the conventional method.

The configuration of each free-form surface used in he present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)[1+\{1-(1+K)y^2/R^2\}^{1/2}]+Ay^4+By^6+Cy^8+Dy^{10}+ \quad (b)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$$x = R \times \cos(A) \quad (c)$$
$$y = R \times \sin(A)$$
$$Z = D_2 +$$
$$D_3 R\cos(A) + D_4 R\sin(A) +$$
$$D_5 R^2\cos(2A) + D_6(R^2 - 1) + D_7 R^2\sin(2A) +$$
$$D_8 R^3\cos(3A) + D_9(3R^3 - 2R)\cos(A) +$$
$$D_{10}(3R^3 - 2R)\sin(A) + D_{11} R^3\sin(3A) +$$
$$D_{12} R^4\cos(4A) + D_{13}(4R^4 - 3R^2)\cos(2A) +$$
$$D_{14}(6R^4 - 6R^2 + 1) + D_{15}(4R^4 - 3R^2)\sin(2A) +$$
$$D_{16} R^4\sin(4A) +$$
$$D_{17} R^5\cos(5A) + D_{18}(5R^5 - 4R^3)\cos(3A) +$$
$$D_{19}(10R^5 - 12R^3 + 3R)\cos(A) +$$
$$D_{20}(10R^5 - 12R^3 + 3R)\sin(A) +$$
$$D_{21}(5R^5 - 4R^3)\sin(3A) + D_{22} R^5\sin(5A) +$$
$$D_{23} R^6\cos(6A) + D_{24}(6R^6 - 5R^4)\cos(4A) +$$
$$D_{25}(15R^6 - 20R^4 + 6R^2)\cos(2A) +$$
$$D_{26}(20R^6 - 30R^4 + 12R^2 - 1) +$$
$$D_{27}(15R^6 - 20R^4 + 6R^2)\sin(2A) +$$
$$D_{28}(6R^6 - 5R^4)\sin(4A) + D_{29} R^6\sin(6A)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

Other examples of surfaces usable in the present invention are expressed by the following defining equation (d):

$$Z=\Sigma\Sigma C_{nm}XY$$

Assuming that k=7 (polynomial of degree 7), for example, a free-form surface is expressed by an expanded form of the above equation as follows:

$$Z = C_2 + \quad (d)$$
$$C_3 y + C_4|x| +$$
$$C_5 y^2 + C_6 y|x| + C_7 x^2 +$$
$$C_8 y^3 + C_9 y^2|x| + C_{10} yx^2 + C_{11}|x^3| +$$
$$C_{12} y^4 + C_{13} y^3|x| + C_{14} y^2 x^2 + C_{15} y|x^3| + C_{16} x^4 +$$
$$C_{17} y^5 + C_{18} y^4|x| + C_{19} y^3 x^2 + C_{20} y^2|x^3| +$$
$$C_{21} yx^4 + C_{22}|x^5| +$$
$$C_{23} y^6 + C_{24} y^5|x| + C_{25} y^4 x^2 + C_{26} y^3|x^3| +$$
$$C_{27} y^2 x^4 + C_{28} y|x^5| + C_{29} x^6 +$$
$$C_{30} y^7 + C_{31} y^6|x| + C_{32} y^5 x^2 + C_{33} y^4|x^3| +$$
$$C_{34} y^3 x^4 + C_{35} y^2|x^5| + C_{36} yx^6 + C_{37}|x^7|$$

Although in the examples of the present invention the surface configuration is expressed by a free-form surface using the above equation (a), it should be noted that the same advantageous effect can be obtained by using the above equation (c) or (d).

In all Examples 1 to 10, photographic field angles are as follows: The horizontal half field angle is 26.3°, and the vertical half field angle is 20.3°. The image height is 1.6×1.2 millimeters. The entrance pupil diameter is 1.15 millimeters. F-number is 2.8. The focal length is 3.24 millimeters, which is equivalent to 35 millimeters in terms of the focal length of a 35-mm silver halide camera. The image-forming optical system according to each example can be applied to other sizes, as a matter of course. The present invention includes not only an image pickup optical system using the image-forming optical system according to the present invention but also an image pickup apparatus incorporating the optical system.

EXAMPLES 1 AND 6

Figure 6:
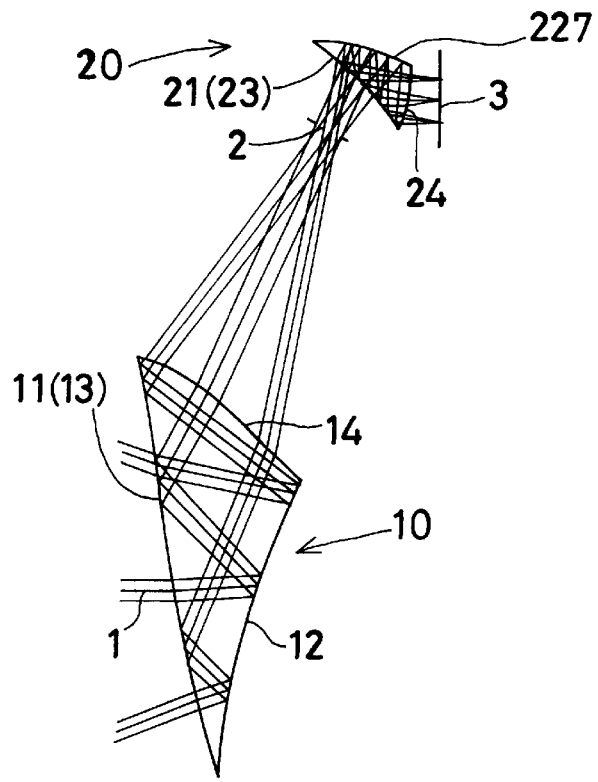
FIG. 6 is a sectional view of an image-forming optical system according to Example 6 of the present invention.

FIGS. 1 and 6 are sectional views of Examples 1 and 6, respectively, taken along the YZ-plane containing the axial principal ray.

Constituent parameters of these examples will be shown later. In the constituent parameters, free-form surfaces are denoted by "FFS", aspherical surfaces by "ASS", and hypothetic planes by "HRP" (Hypothetic Reference Plane). The same shall apply to the other examples.

Examples 1 and 6 each have, in order in which light passes from the object side, a first prism 10, a stop 2, a second prism 20, and an image plane (image-formation plane) 3. The first prism 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter through the first transmitting surface 11 and are reflected successively by the first reflecting surface 12 and the second reflecting surface 13 and then exit from the second transmitting surface 14. The second prism 20 is formed from a first surface 21, a second surface 22, a third surface 23, and a fourth surface 24. The first surface 21 is a first transmitting surface. The second surface 22 is a first reflecting surface. The third surface 23 is a second reflecting surface. The fourth surface 24 is a second transmitting surface. Rays from the object enter through the first transmitting surface 21 and are reflected successively by the first reflecting surface 22 and the second reflecting surface 23 and then exit from the second transmitting surface 24. The first transmitting surface 11 and second reflecting surface 13 of the first prism 10 are the identical optical surface having both transmitting and reflecting actions, and the first transmitting surface 21 and second reflecting surface 23 of the second prism 20 are the identical optical surface having both transmitting and reflecting actions. It should be noted that the surface of the first prism that serves as both the first surface 11 and the third surface 13 corresponds to the first surface in the claims appended to this specification, and the fourth surface 14 corresponds to the third surface in the claims appended to the specification. The same shall apply hereinafter.

In the constituent parameters (shown later), the displacements of each of the surface Nos. 2 to 6 are expressed by the amounts of displacement from the hypothetic plane 1 of surface No. 1. The vertex positions of the surface Nos. 7 and 8 are each expressed by only the surface separation along the axial principal ray from the hypothetic plane 2 of surface No. 6. The displacements of each of the surface Nos. 9 to 13 are expressed by the amounts of displacement from the hypothetic plane 3 of surface No. 8. The image plane is expressed by only the surface separation along the axial principal ray from the hypothetic plane 4 of surface No. 13.

EXAMPLES 2 AND 7

Figure 2:
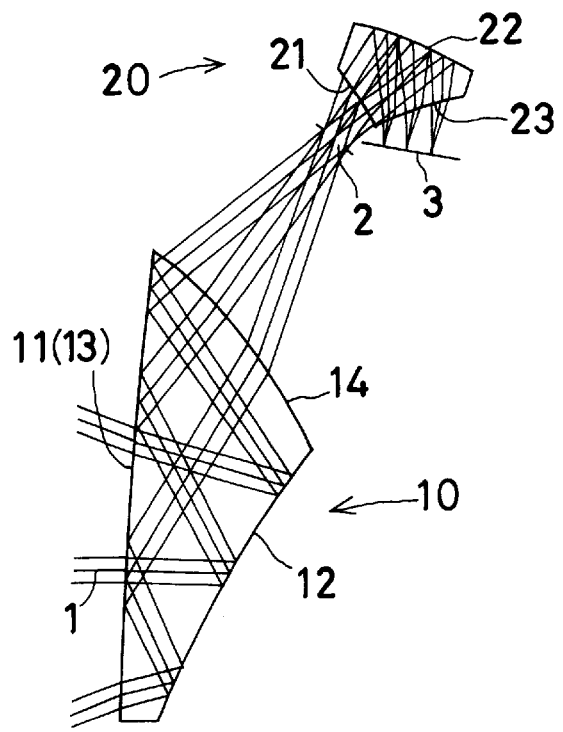
FIG. 2 is a sectional view of an image-forming optical system according to Example 2 of the present invention.
Figure 7:
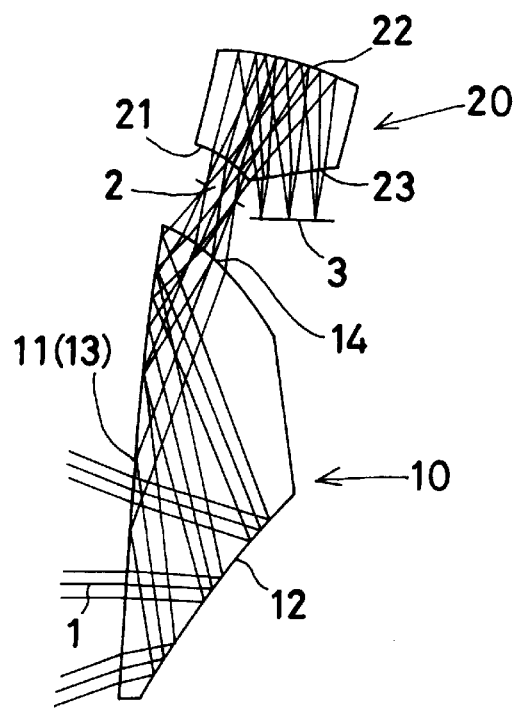
FIG. 7 is a sectional view of an image-forming optical system according to Example 7 of the present invention.

FIGS. 2 and 7 are sectional views of Examples 2 and 7, respectively, taken along the YZ-plane containing the axial principal ray.

Examples 2 and 7 each have, in order in which light passes from the object side, a first prism 10, a stop 2, a second prism 20, and an image plane (image-formation plane) 3. The first prism 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter through the first transmitting surface 11 and are reflected successively by the first reflecting surface 12 and the second reflecting surface 13 and then exit from the second transmitting surface 14. The second prism 20 is formed from a first surface 21, a second surface 22, and a third surface 23. The first surface 21 is a first transmitting surface. The second surface 22 is a first reflecting surface. The third surface 23 is a second transmitting surface. Rays from the object enter through the first transmitting surface 21 and are reflected by the first reflecting surface 22 and then exit from the second transmitting surface 23. The first transmitting surface 11 and second reflecting surface 13 of the first prism 10 are the identical optical surface having both transmitting and reflecting actions.

In the constituent parameters (shown later), the displacements of each of the surfaces Nos. 2 to 6 are expressed by the amounts of displacement from the hypothetic plane 1 of surface No. 1. The vertex positions of the surfaces Nos. 7 and 8 are each expressed by only the surface separation along the axial principal ray from the hypothetic plane 2 of surface No. 6. The displacements of each of the surfaces Nos. 9 to 12 are expressed by the amounts of displacement from the hypothetic plane 3 of surface No. 8. The image plane is expressed by only the surface separation along the axial principal ray from the hypothetic plane 4 of surface No. 12.

EXAMPLES 3 AND 8

Figure 3:
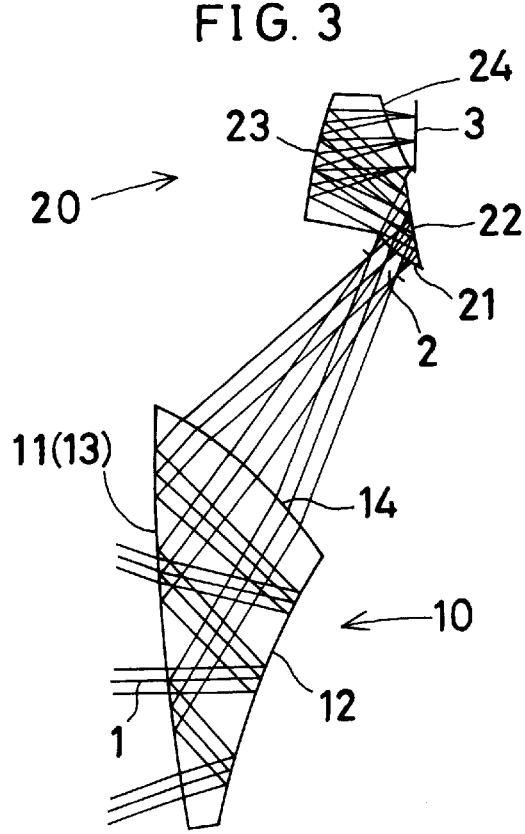
FIG. 3 is a sectional view of an image-forming optical system according to Example 3 of the present invention.
Figure 8:
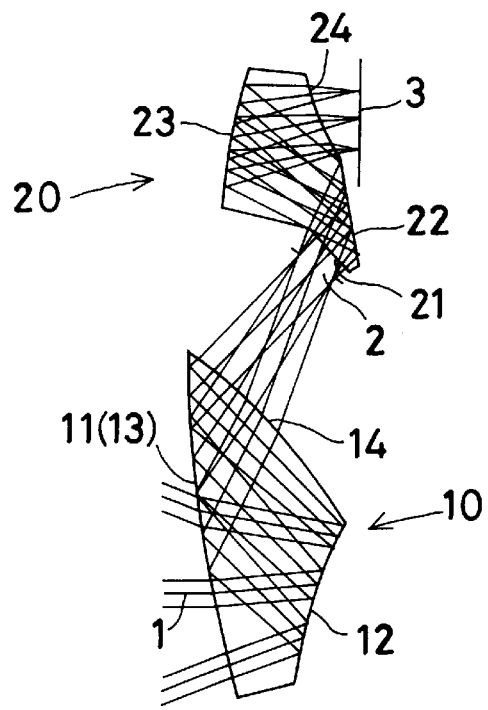
FIG. 8 is a sectional view of an image-forming optical system according to Example 8 of the present invention.

FIGS. 3 and 8 are sectional views of Examples 3 and 8, respectively, taken along the YZ-plane containing the axial principal ray.

Examples 3 and 8 each have, in order in which light passes from the object side, a first prism 10, a stop 2, a second prism 20, and an image plane (image-formation plane) 3. The first prism 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter through the first transmitting surface 11 and are reflected successively by the first reflecting surface 12 and the second reflecting surface 13 and then exit from the second transmitting surface 14. The second prism 20 is formed from a first surface 21, a second surface 22, a third surface 23, and a fourth surface 24. The first surface 21 is a first transmitting surface. The second surface 22 is a first reflecting surface. The third surface 23 is a second reflecting surface. The fourth surface 24 is a second transmitting surface. Rays from the object enter through the first transmitting surface 21 and are reflected successively by the first reflecting surface 22 and the second reflecting surface 23 and then exit from the second transmitting surface 24. The first transmitting surface 11 and second reflecting surface 13 of the first prism 10 are the identical optical surface having both transmitting and reflecting actions.

In the constituent parameters (shown later), the displacements of each of the surface Nos. 2 to 6 are expressed by the amounts of displacement from the hypothetic plane 1 of surface No. 1. The vertex positions of the surface Nos. 7 and 8 are each expressed by only the surface separation along the axial principal ray from the hypothetic plane 2 of surface No. 6. The displacements of each of the surface Nos. 9 to 13 are expressed by the amounts of displacement from the hypothetic plane 3 of surface No. 8. The image plane is expressed by only the surface separation along the axial principal ray from the hypothetic plane 4 of surface No. 13.

EXAMPLES 4 AND 9

Figure 4:
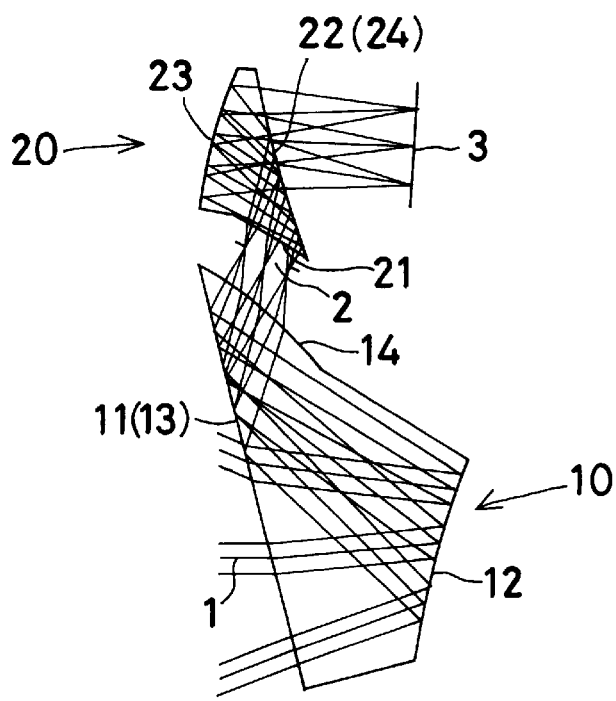
FIG. 4 is a sectional view of an image-forming optical system according to Example 4 of the present invention.
Figure 9:
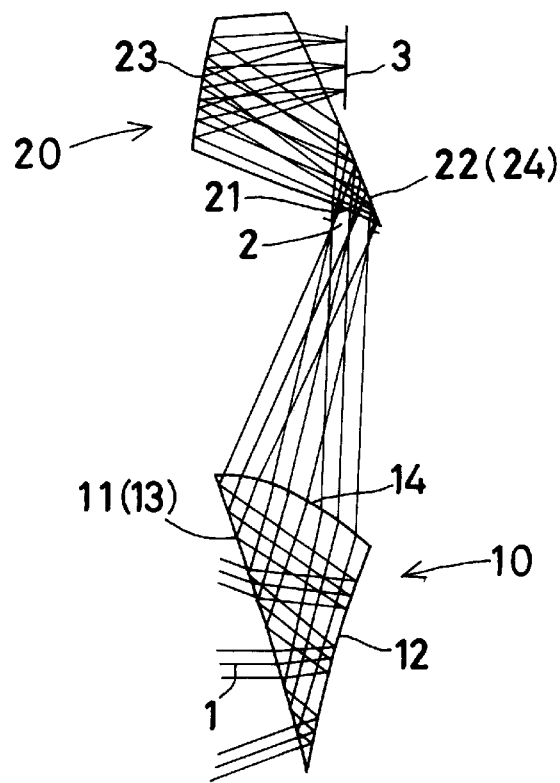
FIG. 9 is a sectional view of an image-forming optical system according to Example 9 of the present invention.

FIGS. 4 and 9 are sectional views of Examples 4 and 9, respectively, taken along the YZ-plane containing the axial principal ray.

Examples 4 and 9 each have, in order in which light passes from the object side, a first prism 10, a stop 2, a second prism 20, and an image plane (image-formation plane) 3. The first prism 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter through the first transmitting surface 11 and are reflected successively by the first reflecting surface 12 and the second reflecting surface 13 and then exit from the second transmitting surface 14. The second prism 20 is formed from a first surface 21, a second surface 22, a third surface 23, and a fourth surface 24. The first surface 21 is a first transmitting surface. The second surface 22 is a first reflecting surface. The third surface 23 is a second reflecting surface. The fourth surface 24 is a second transmitting surface. Rays from the object enter through the first transmitting surface 21 and are reflected successively by the first reflecting surface 22 and the second reflecting surface 23 and then exit from the second transmitting surface 24. The first transmitting surface 11 and second reflecting surface 13 of the first prism 10 are the identical optical surface having both transmitting and reflecting actions, and the first reflecting surface 22 and second transmitting surface 24 of the second prism 20 are the identical optical surface having both transmitting and reflecting actions.

In the constituent parameters (shown later), the displacements of each of the surface Nos. 2 to 6 are expressed by the amounts of displacement from the hypothetic plane 1 of surface No. 1. The vertex positions of the surface Nos. 7 and 8 are each expressed by only the surface separation along the axial principal ray from the hypothetic plane 2 of surface No. 6. The displacements of each of the surface Nos. 9 to 13 are expressed by the amounts of displacement from the hypothetic plane 3 of surface No. 8. The image plane is expressed by only the surface separation along the axial principal ray from the hypothetic plane 4 of surface No. 13.

EXAMPLES 5 AND 10

Figure 5:
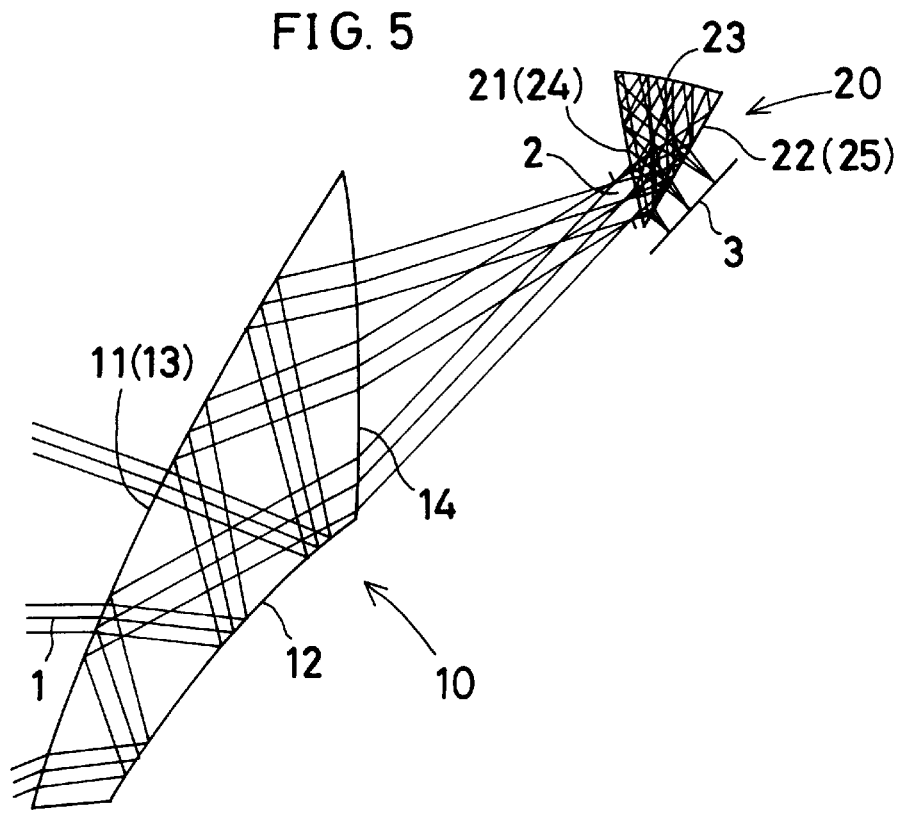
FIG. 5 is a sectional view of an image-forming optical system according to Example 5 of the present invention.
Figure 10:
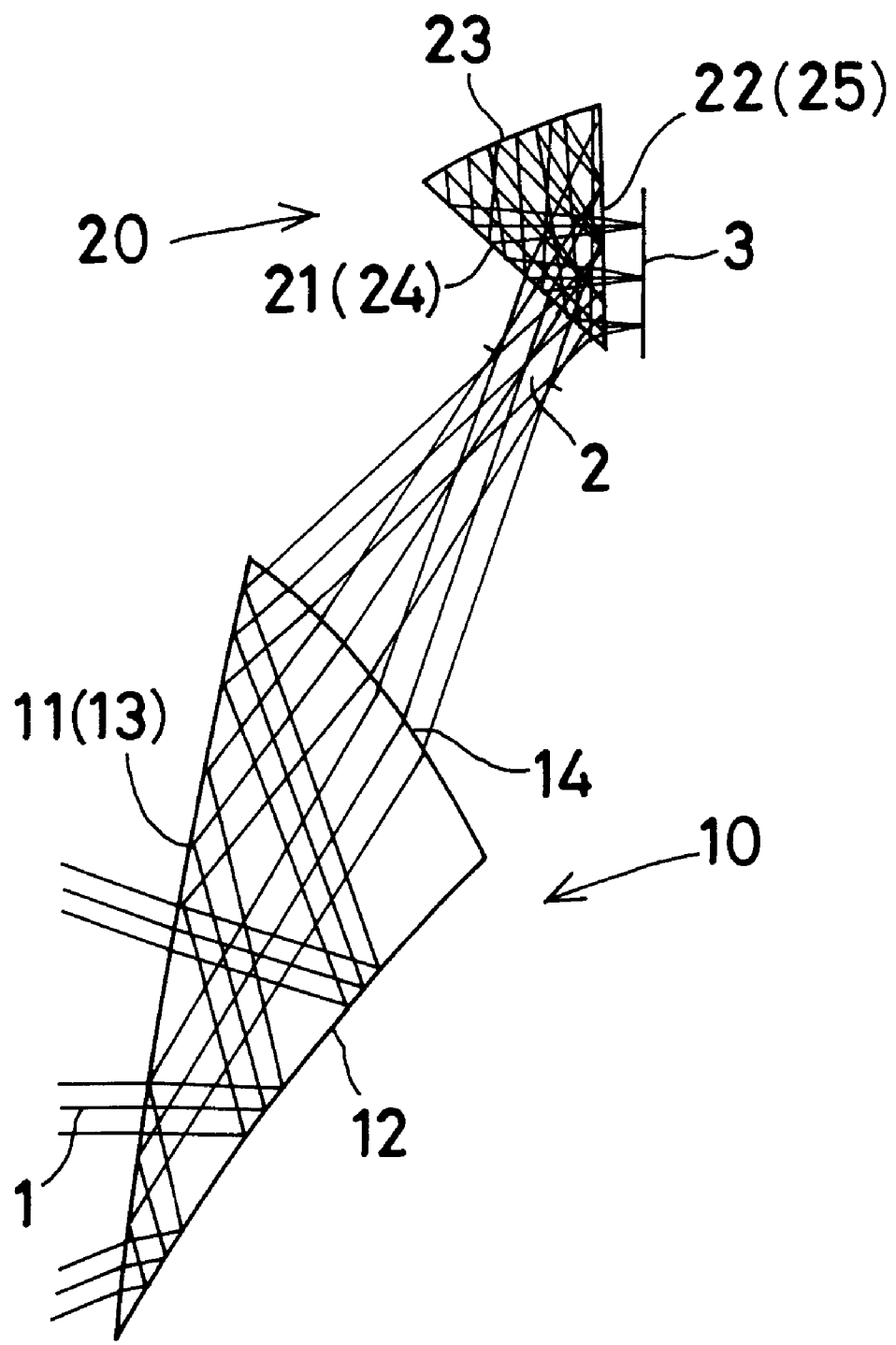
FIG. 10 is a sectional view of an image-forming optical system according to Example 10 of the present invention.

FIGS. 5 and 10 are sectional views of Examples 5 and 10, respectively, taken along the YZ-plane containing the axial principal ray.

Examples 5 and 10 each have, in order in which light passes from the object side, a first prism 10, a stop 2, a second prism 20, and an image plane (image-formation plane) 3. The first prism 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter through the first transmitting surface 11 and are reflected successively by the first reflecting surface 12 and the second reflecting surface 13 and then exit from the second transmitting surface 14. The second prism 20 is formed from a first surface 21, a second surface 22, a third surface 23, a fourth surface 24, and a fifth surface 25. The first surface 21 is a first transmitting surface. The second surface 22 is a first reflecting surface. The third surface 23 is a second reflecting surface. The fourth surface 24 is a third reflecting surface. The fifth surface 25 is a second transmitting surface. Rays from the object enter through the first transmitting surface 21 and are reflected successively by the first reflecting surface 22, the second reflecting surface 23 and the third reflecting surface 24 and then exit from the second transmitting surface 25. The first transmitting surface 11 and second reflecting surface 13 of the first prism 10 are the identical optical surface having both transmitting and reflecting actions. The first transmitting surface 21 and third reflecting surface 24 of the second prism 20 are the identical optical surface having both transmitting and reflecting actions, and the first reflecting surface 22 and second transmitting surface 25 of the second prism 20 are the identical optical surface having both transmitting and reflecting actions.

In the constituent parameters (shown later), the displacements of each of the surface Nos. 2 to 6 are expressed by the amounts of displacement from the hypothetic plane 1 of surface No. 1. The vertex positions of the surface Nos. 7 and 8 are each expressed by only the surface separation along the axial principal ray from the hypothetic plane 2 of surface No. 6. The displacements of each of the surface Nos. 9 to 14 are expressed by the amounts of displacement from the hypothetic plane 3 of surface No. 8. The image plane is expressed by only the surface separation along the axial principal ray from the hypothetic plane 4 of surface No. 14.

Constituent parameters in the foregoing Examples 1 to 10 are shown below. In the tables below: "FFS" denotes a free-form surface; "ASS" denotes an aspherical surface; and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | 382.42 | | (3) | | |
| 6 | ∞ (HRP2) | 3.84 | (4) | | |
| 7 | ∞ (Stop) | 2.50 | | | |
| 8 | ∞ (HRP3) | | | | |
| 9 | FFS③ | | (5) | 1.4924 | 57.6 |
| 10 | FFS④ | | (6) | 1.4924 | 57.6 |
| 11 | FFS⑤ | | (5) | 1.4924 | 57.6 |
| 12 | 124.10 | | (7) | | |
| 13 | ∞ (HRP4) | 2.00 | (8) | | |
| Image plane | ∞ | | | | |

FFS①
$C_4$   $1.4296 \times 10^{-2}$   $C_6$   $9.9768 \times 10^{-3}$

FFS②
$C_4$   $1.9038 \times 10^{-2}$   $C_6$   $1.8551 \times 10^{-2}$

FFS③
$C_4$   $3.2035 \times 10^{-3}$   $C_6$   $-3.6961 \times 10^{-3}$

FFS④
$C_4$   $-3.3499 \times 10^{-2}$   $C_6$   $-3.2417 \times 10^{-2}$

Displacement and tilt (1)
| X | 0.00 | Y | 8.60 | Z | 5.35 |
| α | −37.60 | β | 0.00 | γ | 0.00 |

Displacement and tilt (2)
| X | 0.00 | Y | −0.91 | Z | 5.74 |
| α | −48.32 | β | 0.00 | γ | 0.00 |

Displacement and tilt (3)
| X | 0.00 | Y | 9.63 | Z | 10.01 |
| α | −10.27 | β | 0.00 | γ | 0.00 |

Displacement and tilt (4)
| X | 0.00 | Y | 9.63 | Z | 10.01 |
| α | 24.92 | β | 0.00 | γ | 0.00 |

Displacement and tilt (5)
| X | 0.00 | Y | −0.71 | Z | −0.47 |
| α | −33.59 | β | 0.00 | γ | 0.00 |

Displacement and tilt (6)
| X | 0.00 | Y | −0.29 | Z | 1.41 |
| α | 0.41 | β | 0.00 | γ | 0.00 |

Displacement and tilt (7)
| X | 0.00 | Y | −2.86 | Z | −0.08 |
| α | −94.11 | β | 0.00 | γ | 0.00 |

Displacement and tilt (8)
| X | 0.00 | Y | −2.86 | Z | −0.08 |
| α | −72.30 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP2) | 9.65 | (4) | | |
| 7 | ∞ (Stop) | 2.07 | | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | | |
| 12 | ∞ (HRP4) | 1.86 | (8) | | |
| Image plane | ∞ | | | | |

FFS①
$C_4$   $1.1955 \times 10^{-2}$   $C_6$   $1.5520 \times 10^{-3}$

FFS②
$C_4$   $1.5256 \times 10^{-2}$   $C_6$   $6.9408 \times 10^{-3}$

FFS③
$C_4$   $-5.8280 \times 10^{-3}$   $C_6$   $-2.0220 \times 10^{-2}$

FFS④
$C_4$   $2.7995 \times 10^{-2}$   $C_6$   $7.0096 \times 10^{-3}$

FFS⑤
$C_4$   $-3.7858 \times 10^{-2}$   $C_6$   $-3.4001 \times 10^{-2}$

FFS⑥
$C_4$   $-2.1744 \times 10^{-3}$   $C_6$   $-2.4022 \times 10^{-2}$

Displacement and tilt (1)
X 0.00   Y 7.85   Z 0.42
α -3.79   β 0.00   γ 0.00

Displacement and tilt (2)
X 0.00   Y -0.07   Z 5.13
α -30.05   β 0.00   γ 0.00

Displacement and tilt (3)
X 0.00   Y 12.38   Z 3.99
α 47.27   β 0.00   γ 0.00

Displacement and tilt (4)
X 0.00   Y 12.38   Z 3.99
α 53.94   β 0.00   γ 0.00

Displacement and tilt (5)
X 0.00   Y 0.00   Z 0.00
α -19.57   β 0.00   γ 0.00

Displacement and tilt (6)
X 0.00   Y -0.44   Z 3.84
α 15.15   β 0.00   γ 0.00

Displacement and tilt (7)
X 0.00   Y -2.40   Z 1.24
α 55.90   β 0.00   γ 0.00

Displacement and tilt (8)
X 0.00   Y -2.40   Z 1.24
α 26.83   β 0.00   γ 0.00

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | ASS① | | (3) | | |
| 6 | ∞ (HRP2) | 11.56 | (4) | | |
| 7 | ∞ (Stop) | 1.00 | | | |
| 8 | ∞ (HRP3) | | | | |
| 9 | ASS② | | (5) | 1.4924 | 57.6 |
| 10 | FFS③ | | (6) | 1.4924 | 57.6 |
| 11 | FFS④ | | (7) | 1.4924 | 57.6 |
| 12 | FFS⑤ | | (8) | | |
| 13 | ∞ (HRP4) | 1.00 | (9) | | |
| Image plane | ∞ | | | | |

ASS①
R   -18.20
K   0.0000
A   $5.0172 \times 10^{-5}$

ASS②
R   8.88
K   0.0000
A   $-4.7680 \times 10^{-4}$

FFS①
$C_4$   $7.8067 \times 10^{-3}$   $C_6$   $3.6886 \times 10^{-3}$

FFS②
$C_4$   $1.4808 \times 10^{-2}$   $C_6$   $1.3198 \times 10^{-2}$

FFS③
$C_4$   $8.5356 \times 10^{-3}$   $C_6$   $1.4059 \times 10^{-3}$

FFS④
$C_4$   $4.2361 \times 10^{-2}$   $C_6$   $3.1162 \times 10^{-2}$

FFS⑤
$C_4$   $-1.8407 \times 10^{-3}$   $C_6$   $3.4570 \times 10^{-2}$

Displacement and tilt (1)
X 0.00   Y 4.88   Z -0.55
α 5.41   β 0.00   γ 0.00

Displacement and tilt (2)
X 0.00   Y 0.19   Z 4.46
α -20.29   β 0.00   γ 0.00

Displacement and tilt (3)
X 0.00   Y 10.29   Z 3.40
α 50.55   β 0.00   γ 0.00

Displacement and tilt (4)
X 0.00   Y 10.29   Z 3.40
α 55.52   β 0.00   γ 0.00

Displacement and tilt (5)
X 0.00   Y 0.00   Z 0.00
α -4.66   β 0.00   γ 0.00

Displacement and tilt (6)
X 0.00   Y -0.05   Z 1.69
α -44.05   β 0.00   γ 0.00

Displacement and tilt (7)
X 0.00   Y 5.81   Z 1.34
α -66.68   β 0.00   γ 0.00

-continued

| | | Displacement and tilt (8) | | | | |
|---|---|---|---|---|---|---|
| X | 0.00 | Y | 2.88 | Z | 4.09 | |
| α | −30.05 | β | 0.00 | γ | 0.00 | |
| | | Displacement and tilt (9) | | | | |
| X | 0.00 | Y | 2.88 | Z | 4.09 | |
| α | −55.52 | β | 0.00 | γ | 0.00 | |

EXAMPLE 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | ASS① | | (3) | | |
| 6 | ∞ (HRP2) | 1.90 | (4) | | |
| 7 | ∞ (Stop) | 0.70 | | | |
| 8 | ∞ (HRP3) | | | | |
| 9 | ASS② | | (5) | 1.4924 | 57.6 |
| 10 | FFS③ | | (6) | 1.4924 | 57.6 |
| 11 | FFS④ | | (7) | 1.4924 | 57.6 |
| 12 | FFS③ | | (6) | | |
| 13 | ∞ (HRP4) | 5.57 | (8) | | |
| Image plane | ∞ | | | | |

| ASS① | |
|---|---|
| R | −13.86 |
| K | 0.0000 |
| A | $9.5317 \times 10^{-4}$ |

| ASS② | |
|---|---|
| R | −56.64 |
| K | 0.0000 |
| A | $6.6045 \times 10^{-4}$ |

| | FFS① | | |
|---|---|---|---|
| $C_4$ | $3.9089 \times 10^{-3}$ | $C_6$ | $7.9358 \times 10^{-4}$ |
| | FFS② | | |
| $C_4$ | $1.7448 \times 10^{-2}$ | $C_6$ | $1.2894 \times 10^{-2}$ |
| | FFS③ | | |
| $C_4$ | $7.7148 \times 10^{-3}$ | $C_6$ | $3.7680 \times 10^{-3}$ |
| | FFS④ | | |
| $C_4$ | $3.1920 \times 10^{-2}$ | $C_6$ | $2.8049 \times 10^{-2}$ |

| | | Displacement and tilt (1) | | | |
|---|---|---|---|---|---|
| X | 0.00 | Y | 7.01 | Z | −1.88 |
| α | 14.59 | β | 0.00 | γ | 0.00 |
| | | Displacement and tilt (2) | | | |
| X | 0.00 | Y | 0.59 | Z | 6.63 |
| α | −15.98 | β | 0.00 | γ | 0.00 |
| | | Displacement and tilt (3) | | | |
| X | 0.00 | Y | 9.57 | Z | −0.74 |
| α | 51.64 | β | 0.00 | γ | 0.00 |
| | | Displacement and tilt (4) | | | |
| X | 0.00 | Y | 9.57 | Z | −0.74 |
| α | 73.76 | β | 0.00 | γ | 0.00 |
| | | Displacement and tilt (5) | | | |
| X | 0.00 | Y | 0.00 | Z | 0.00 |
| α | −14.20 | β | 0.00 | γ | 0.00 |
| | | Displacement and tilt (6) | | | |
| X | 0.00 | Y | −0.13 | Z | 1.62 |
| α | −56.78 | β | 0.00 | γ | 0.00 |
| | | Displacement and tilt (7) | | | |
| X | 0.00 | Y | 3.26 | Z | 2.78 |
| α | −89.83 | β | 0.00 | γ | 0.00 |
| | | Displacement and tilt (8) | | | |
| X | 0.00 | Y | 1.09 | Z | 3.53 |
| α | −77.42 | β | 0.00 | γ | 0.00 |

EXAMPLE 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | ASS① | | (3) | | |
| 6 | ∞ (HRP2) | 12.02 | (4) | | |
| 7 | ∞ (Stop) | 0.70 | | | |
| 8 | ∞ (HRP3) | | | | |
| 9 | FFS③ | | (5) | 1.4924 | 57.6 |
| 10 | FFS④ | | (6) | 1.4924 | 57.6 |
| 11 | FFS⑤ | | (7) | 1.4924 | 57.6 |
| 12 | FFS③ | | (8) | 1.4924 | 57.6 |
| 13 | FFS④ | | (6) | | |
| 14 | ∞ (HRP4) | 1.28 | (9) | | |
| Image plane | ∞ | | | | |

| ASS① | |
|---|---|
| R | −80.56 |
| K | 0.0000 |
| A | $4.3527 \times 10^{-6}$ |

| | FFS① | | |
|---|---|---|---|
| $C_4$ | $1.1870 \times 10^{-2}$ | $C_6$ | $6.3181 \times 10^{-3}$ |
| | FFS② | | |
| $C_4$ | $1.7417 \times 10^{-2}$ | $C_6$ | $1.3428 \times 10^{-2}$ |
| | FFS③ | | |
| $C_4$ | $2.0838 \times 10^{-3}$ | $C_6$ | $2.2621 \times 10^{-3}$ |
| | FFS④ | | |
| $C_4$ | $-4.0115 \times 10^{-3}$ | $C_6$ | $-4.6924 \times 10^{-3}$ |
| | FFS⑤ | | |
| $C_4$ | $3.4482 \times 10^{-2}$ | $C_6$ | $2.3522 \times 10^{-2}$ |

| | | Displacement and tilt (1) | | | |
|---|---|---|---|---|---|
| X | 0.00 | Y | 7.00 | Z | 3.34 |
| α | −28.35 | β | 0.00 | γ | 0.00 |
| | | Displacement and tilt (2) | | | |
| X | 0.00 | Y | −0.70 | Z | 5.14 |
| α | −42.31 | β | 0.00 | γ | 0.00 |

-continued

|   | Displacement and tilt (3) |   |   |   |   |
|---|---|---|---|---|---|
| X | 0.00 | Y | 9.42 | Z | 9.93 |
| α | 1.50 | β | 0.00 | γ | 0.00 |
|   | Displacement and tilt (4) |   |   |   |   |
| X | 0.00 | Y | 9.42 | Z | 9.93 |
| α | 30.06 | β | 0.00 | γ | 0.00 |
|   | Displacement and tilt (5) |   |   |   |   |
| X | 0.00 | Y | 1.41 | Z | 0.47 |
| α | −18.41 | β | 0.00 | γ | 0.00 |
|   | Displacement and tilt (6) |   |   |   |   |
| X | 0.00 | Y | −0.16 | Z | 1.51 |
| α | −60.40 | β | 0.00 | γ | 0.00 |
|   | Displacement and tilt (7) |   |   |   |   |
| X | 0.00 | Y | 3.04 | Z | 2.98 |
| α | −130.95 | β | 0.00 | γ | 0.00 |
|   | Displacement and tilt (8) |   |   |   |   |
| X | 0.00 | Y | 1.41 | Z | 0.47 |
| α | −18.41 | β | 0.00 | γ | 0.00 |
|   | Displacement and tilt (9) |   |   |   |   |
| X | 0.00 | Y | −0.37 | Z | 1.13 |
| α | 105.84 | β | 0.00 | γ | 0.00 |

EXAMPLE 6

| Surface No. | Radius of curvature | Surface separation | Displacement and tilt | Refractive index | Abbe's No. |
|---|---|---|---|---|---|
| Object plane | ∞ | ∞ |   |   |   |
| 1 | ∞ (HRP1) |   |   |   |   |
| 2 | FFS① |   | (1) | 1.4924 | 57.6 |
| 3 | FFS② |   | (2) | 1.4924 | 57.6 |
| 4 | FFS① |   | (1) | 1.4924 | 57.6 |
| 5 | FFS③ |   | (3) |   |   |
| 6 | ∞ (HRP2) | 15.97 | (4) |   |   |
| 7 | ∞ (Stop) | 3.24 |   |   |   |
| 8 | ∞ (HRP3) |   |   |   |   |
| 9 | FFS④ |   | (5) | 1.4924 | 57.6 |
| 10 | FFS⑤ |   | (6) | 1.4924 | 57.6 |
| 11 | FFS④ |   | (7) | 1.4924 | 57.6 |
| 12 | FFS⑥ |   | (8) |   |   |
| 13 | ∞ (HRP4) | 2.00 | (9) |   |   |
| Image plane | ∞ |   |   |   |   |

FFS①

$C_4$ $5.9393 \times 10^{-3}$ $C_6$ $-1.2229 \times 10^{-3}$ $C_8$ $-2.9782 \times 10^{-4}$
$C_{10}$ $-3.5219 \times 10^{-4}$

FFS②

$C_4$ $1.2768 \times 10^{-2}$ $C_6$ $8.3973 \times 10^{-3}$ $C_8$ $-2.7915 \times 10^{-4}$
$C_{10}$ $-5.0168 \times 10^{-4}$

FFS③

$C_4$ $-1.8831 \times 10^{-2}$ $C_6$ $-3.6070 \times 10^{-2}$ $C_8$ $-6.3614 \times 10^{-4}$
$C_{10}$ $-2.5452 \times 10^{-3}$

FFS④

$C_4$ $-1.5661 \times 10^{-2}$ $C_6$ $-8.7371 \times 10^{-3}$ $C_8$ $1.5075 \times 10^{-3}$
$C_{10}$ $3.6809 \times 10^{-4}$

FFS⑤

$C_4$ $-3.9821 \times 10^{-2}$ $C_6$ $-3.6601 \times 10^{-2}$ $C_8$ $4.3893 \times 10^{-4}$
$C_{10}$ $2.6200 \times 10^{-5}$

FFS⑥

$C_4$ $-4.8979 \times 10^{-2}$ $C_6$ $-4.8340 \times 10^{-2}$ $C_8$ $-9.9320 \times 10^{-3}$
$C_{10}$ $-9.9409 \times 10^{-3}$

|   | Displacement and tilt (1) |   |   |   |   |
|---|---|---|---|---|---|
| X | 0.00 | Y | 6.01 | Z | −1.01 |
| α | 9.24 | β | 0.00 | γ | 0.00 |
|   | Displacement and tilt (2) |   |   |   |   |
| X | 0.00 | Y | 0.31 | Z | 5.05 |
| α | −19.84 | β | 0.00 | γ | 0.00 |
|   | Displacement and tilt (3) |   |   |   |   |
| X | 0.00 | Y | 11.30 | Z | 1.83 |
| α | 53.97 | β | 0.00 | γ | 0.00 |
|   | Displacement and tilt (4) |   |   |   |   |
| X | 0.00 | Y | 11.30 | Z | 1.83 |
| α | 65.57 | β | 0.00 | γ | 0.00 |
|   | Displacement and tilt (5) |   |   |   |   |
| X | 0.00 | Y | −1.32 | Z | −0.53 |
| α | −22.67 | β | 0.00 | γ | 0.00 |
|   | Displacement and tilt (6) |   |   |   |   |
| X | 0.00 | Y | −0.24 | Z | 1.86 |
| α | 8.55 | β | 0.00 | γ | 0.00 |
|   | Displacement and tilt (7) |   |   |   |   |
| X | 0.00 | Y | −1.32 | Z | −0.53 |
| α | −22.67 | β | 0.00 | γ | 0.00 |
|   | Displacement and tilt (8) |   |   |   |   |
| X | 0.00 | Y | −3.29 | Z | 0.20 |
| α | −77.93 | β | 0.00 | γ | 0.00 |
|   | Displacement and tilt (9) |   |   |   |   |
| X | 0.00 | Y | −3.29 | Z | 0.20 |
| α | −65.57 | β | 0.00 | γ | 0.00 |

EXAMPLE 7

| Surface No. | Radius of curvature | Surface separation | Displacement and tilt | Refractive index | Abbe's No. |
|---|---|---|---|---|---|
| Object plane | ∞ | ∞ |   |   |   |
| 1 | ∞ (HRP1) |   |   |   |   |
| 2 | FFS① |   | (1) | 1.4924 | 57.6 |
| 3 | FFS② |   | (2) | 1.4924 | 57.6 |
| 4 | FFS① |   | (1) | 1.4924 | 57.6 |
| 5 | FFS③ |   | (3) |   |   |
| 6 | ∞ (HRP2) | 2.58 | (4) |   |   |
| 7 | ∞ (Stop) | 1.40 |   |   |   |
| 8 | ∞ (HRP3) |   |   |   |   |
| 9 | FFS④ |   | (5) | 1.4924 | 57.6 |
| 10 | FFS⑤ |   | (6) | 1.4924 | 57.6 |
| 11 | FFS⑥ |   | (7) |   |   |
| 12 | ∞ (HRP4) | 1.91 | (8) |   |   |
| Image plane | ∞ |   |   |   |   |

FFS①

$C_4$ $1.4983 \times 10^{-2}$ $C_6$ $1.7321 \times 10^{-3}$ $C_8$ $2.4849 \times 10^{-4}$
$C_{10}$ $-1.4548 \times 10^{-5}$

FFS②

$C_4$ $1.6736 \times 10^{-2}$ $C_6$ $8.1401 \times 10^{-3}$ $C_8$ $2.2207 \times 10^{-4}$
$C_{10}$ $-1.2309 \times 10^{-4}$ -continued

FFS①

| | | | | | |
|---|---|---|---|---|---|
| $C_4$ | $-3.3911 \times 10^{-2}$ | $C_6$ | $-3.7842 \times 10^{-2}$ | $C_8$ | $-1.0624 \times 10^{-3}$ |
| $C_{10}$ | $-4.5001 \times 10^{-4}$ | | | | |

FFS④

| | | | | | |
|---|---|---|---|---|---|
| $C_4$ | $-1.7444 \times 10^{-2}$ | $C_6$ | $-5.2972 \times 10^{-2}$ | $C_8$ | $1.7330 \times 10^{-2}$ |
| $C_{10}$ | $-1.1543 \times 10^{-2}$ | | | | |

FFS⑤

| | | | | | |
|---|---|---|---|---|---|
| $C_4$ | $-3.8365 \times 10^{-2}$ | $C_6$ | $-3.9517 \times 10^{-2}$ | $C_8$ | $-8.4819 \times 10^{-4}$ |
| $C_{10}$ | $-3.3984 \times 10^{-4}$ | | | | |

FFS⑥

| | | | | | |
|---|---|---|---|---|---|
| $C_4$ | $8.1592 \times 10^{-3}$ | $C_6$ | $-7.6829 \times 10^{-3}$ | $C_8$ | $-5.7204 \times 10^{-3}$ |
| $C_{10}$ | $-1.8179 \times 10^{-3}$ | | | | |

Displacement and tilt (1)

| X | 0.00 | Y | 11.30 | Z | 0.84 |
|---|---|---|---|---|---|
| α | -5.50 | β | 0.00 | γ | 0.00 |

Displacement and tilt (2)

| X | 0.00 | Y | -0.07 | Z | 4.08 |
|---|---|---|---|---|---|
| α | -37.55 | β | 0.00 | γ | 0.00 |

Displacement and tilt (3)

| X | 0.00 | Y | 15.06 | Z | 2.74 |
|---|---|---|---|---|---|
| α | 56.89 | β | 0.00 | γ | 0.00 |

Displacement and tilt (4)

| X | 0.00 | Y | 15.06 | Z | 2.74 |
|---|---|---|---|---|---|
| α | 66.24 | β | 0.00 | γ | 0.00 |

Displacement and tilt (5)

| X | 0.00 | Y | 0.00 | Z | 0.00 |
|---|---|---|---|---|---|
| α | -13.89 | β | 0.00 | γ | 0.00 |

Displacement and tilt (6)

| X | 0.00 | Y | -0.42 | Z | 5.15 |
|---|---|---|---|---|---|
| α | 11.23 | β | 0.00 | γ | 0.00 |

Displacement and tilt (7)

| X | 0.00 | Y | -2.68 | Z | 0.72 |
|---|---|---|---|---|---|
| α | 33.93 | β | 0.00 | γ | 0.00 |

Displacement and tilt (8)

| X | 0.00 | Y | -2.68 | Z | 0.72 |
|---|---|---|---|---|---|
| α | 23.70 | β | 0.00 | γ | 0.00 |

EXAMPLE 8

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP2) | 6.42 | (4) | | |
| 7 | ∞ (Stop) | 1.00 | | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS⑦ | | (8) | | |
| 13 | ∞ (HRP4) | | (9) | 1.65 | |
| Image plane | ∞ | | | | |

FFS①

| | | | | | |
|---|---|---|---|---|---|
| $C_4$ | $1.9017 \times 10^{-2}$ | $C_6$ | $9.4874 \times 10^{-3}$ | $C_8$ | $-6.3019 \times 10^{-4}$ |
| $C_{10}$ | $-6.6834 \times 10^{-5}$ | | | | |

FFS②

| | | | | | |
|---|---|---|---|---|---|
| $C_4$ | $2.7555 \times 10^{-2}$ | $C_6$ | $2.6344 \times 10^{-2}$ | $C_8$ | $-1.0230 \times 10^{-3}$ |
| $C_{10}$ | $-5.5242 \times 10^{-4}$ | | | | |

FFS③

| | | | | | |
|---|---|---|---|---|---|
| $C_4$ | $-2.1721 \times 10^{-2}$ | $C_6$ | $-1.5678 \times 10^{-2}$ | $C_8$ | $-1.3602 \times 10^{-3}$ |
| $C_{10}$ | $5.5075 \times 10^{-4}$ | | | | |

FFS④

| | | | | | |
|---|---|---|---|---|---|
| $C_4$ | $5.9900 \times 10^{-2}$ | $C_6$ | $-2.0854 \times 10^{-2}$ | $C_8$ | $-6.5229 \times 10^{-3}$ |
| $C_{10}$ | $-1.4181 \times 10^{-3}$ | | | | |

FFS⑤

| | | | | | |
|---|---|---|---|---|---|
| $C_4$ | $2.6855 \times 10^{-2}$ | $C_6$ | $-5.1420 \times 10^{-3}$ | $C_8$ | $-9.5891 \times 10^{-4}$ |
| $C_{10}$ | $-1.1119 \times 10^{-4}$ | | | | |

FFS⑥

| | | | | | |
|---|---|---|---|---|---|
| $C_4$ | $4.4923 \times 10^{-2}$ | $C_6$ | $2.9066 \times 10^{-2}$ | $C_8$ | $-4.3737 \times 10^{-4}$ |
| $C_{10}$ | $-4.6585 \times 10^{-5}$ | | | | |

FFS⑦

| | | | | | |
|---|---|---|---|---|---|
| $C_4$ | $-1.4692 \times 10^{-2}$ | $C_6$ | $6.0081 \times 10^{-2}$ | $C_8$ | $1.7186 \times 10^{-3}$ |
| $C_{10}$ | $-5.8896 \times 10^{-3}$ | | | | |

Displacement and tilt (1)

| X | 0.00 | Y | 5.70 | Z | -0.83 |
|---|---|---|---|---|---|
| α | 5.01 | β | 0.00 | γ | 0.00 |

Displacement and tilt (2)

| X | 0.00 | Y | 0.32 | Z | 4.68 |
|---|---|---|---|---|---|
| α | -20.26 | β | 0.00 | γ | 0.00 |

Displacement and tilt (3)

| X | 0.00 | Y | 8.34 | Z | 1.06 |
|---|---|---|---|---|---|
| α | 49.29 | β | 0.00 | γ | 0.00 |

Displacement and tilt (4)

| X | 0.00 | Y | 8.34 | Z | 1.06 |
|---|---|---|---|---|---|
| α | 56.90 | β | 0.00 | γ | 0.00 |

Displacement and tilt (5)

| X | 0.00 | Y | 0.00 | Z | 0.00 |
|---|---|---|---|---|---|
| α | -8.03 | β | 0.00 | γ | 0.00 |

Displacement and tilt (6)

| X | 0.00 | Y | -0.08 | Z | 1.65 |
|---|---|---|---|---|---|
| α | -45.80 | β | 0.00 | γ | 0.00 |

Displacement and tilt (7)

| X | 0.00 | Y | 6.04 | Z | 1.54 |
|---|---|---|---|---|---|
| α | -68.55 | β | 0.00 | γ | 0.00 |

Displacement and tilt (8)

| X | 0.00 | Y | 3.04 | Z | 4.22 |
|---|---|---|---|---|---|
| α | -31.37 | β | 0.00 | γ | 0.00 |

Displacement and tilt (9)

| X | 0.00 | Y | 3.04 | Z | 4.22 |
|---|---|---|---|---|---|
| α | -56.90 | β | 0.00 | γ | 0.00 |

EXAMPLE 9

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP2) | 13.26 | (4) | | |
| 7 | ∞ (Stop) | 0.70 | | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS⑤ | | (6) | | |
| 13 | ∞ (HRP4) | 1.60 | (8) | | |
| Image plane | ∞ | | | | |

FFS①
$C_4$ $1.0619 \times 10^{-2}$ $C_6$ $-1.7499 \times 10^{-3}$ $C_8$ $-7.9953 \times 10^{-4}$
$C_{10}$ $-2.3343 \times 10^{-6}$ FFS②
$C_4$ $2.0488 \times 10^{-2}$ $C_6$ $1.1616 \times 10^{-2}$ $C_8$ $-4.7526 \times 10^{-4}$
$C_{10}$ $1.6098 \times 10^{-5}$ FFS③
$C_4$ $1.1113 \times 10^{-2}$ $C_6$ $-1.6314 \times 10^{-2}$ $C_8$ $-3.1814 \times 10^{-3}$
$C_{10}$ $-1.6792 \times 10^{-3}$ FFS④
$C_4$ $3.1658 \times 10^{-2}$ $C_6$ $-4.4280 \times 10^{-2}$ $C_8$ $-4.5426 \times 10^{-3}$
$C_{10}$ $5.7713 \times 10^{-3}$ FFS⑤
$C_4$ $8.3132 \times 10^{-3}$ $C_6$ $-8.4438 \times 10^{-3}$ $C_8$ $-5.8294 \times 10^{-4}$
$C_{10}$ $2.9797 \times 10^{-4}$ FFS⑥
$C_4$ $3.3327 \times 10^{-2}$ $C_6$ $2.1602 \times 10^{-2}$ $C_8$ $1.0673 \times 10^{-5}$
$C_{10}$ $-5.1019 \times 10^{-4}$

| Displacement and tilt (1) | | | | | | |
|---|---|---|---|---|---|---|
| X | 0.00 | Y | 3.00 | Z | -0.99 |
| α | 18.61 | β | 0.00 | γ | 0.00 |

| Displacement and tilt (2) | | | | | | |
|---|---|---|---|---|---|---|
| X | 0.00 | Y | 0.28 | Z | 2.67 |
| α | -15.30 | β | 0.00 | γ | 0.00 |

| Displacement and tilt (3) | | | | | | |
|---|---|---|---|---|---|---|
| X | 0.00 | Y | 8.44 | Z | 0.58 |
| α | 67.55 | β | 0.00 | γ | 0.00 |

| Displacement and tilt (4) | | | | | | |
|---|---|---|---|---|---|---|
| X | 0.00 | Y | 8.44 | Z | 0.58 |
| α | 76.99 | β | 0.00 | γ | 0.00 |

| Displacement and tilt (5) | | | | | | |
|---|---|---|---|---|---|---|
| X | 0.00 | Y | 0.00 | Z | 0.00 |
| α | -11.01 | β | 0.00 | γ | 0.00 |

| Displacement and tilt (6) | | | | | | |
|---|---|---|---|---|---|---|
| X | 0.00 | Y | -0.10 | Z | 1.59 |
| α | -54.55 | β | 0.00 | γ | 0.00 |

| Displacement and tilt (7) | | | | | | |
|---|---|---|---|---|---|---|
| X | 0.00 | Y | 8.97 | Z | 4.10 |
| α | -86.68 | β | 0.00 | γ | 0.00 |

| Displacement and tilt (8) | | | | | | |
|---|---|---|---|---|---|---|
| X | 0.00 | Y | 3.54 | Z | 6.30 |
| α | -76.99 | β | 0.00 | γ | 0.00 |

EXAMPLE 10

| Surface No. | Radius of curvature | Surface separation | Displacement and tilt | Refractive index | Abbe's No. |
|---|---|---|---|---|---|
| Object plane | ∞ | ∞ | | | |
| 1 | ∞ (HRP1) | | | | |
| 2 | FFS① | | (1) | 1.4924 | 57.6 |
| 3 | FFS② | | (2) | 1.4924 | 57.6 |
| 4 | FFS① | | (1) | 1.4924 | 57.6 |
| 5 | FFS③ | | (3) | | |
| 6 | ∞ (HRP2) | 8.03 | (4) | | |
| 7 | ∞ (Stop) | 1.70 | | | |
| 8 | ∞ (HRP3) | | | | |
| 9 | FFS④ | | (5) | 1.4924 | 57.6 |
| 10 | FFS⑤ | | (6) | 1.4924 | 57.6 |
| 11 | FFS⑥ | | (7) | 1.4924 | 57.6 |
| 12 | FFS④ | | (8) | 1.4924 | 57.6 |
| 13 | FFS⑤ | | (6) | | |
| 14 | ∞ (HRP4) | 1.01 | (9) | | |
| Image plane | ∞ | | | | |

FFS①
$C_4$ $1.0993 \times 10^{-2}$ $C_6$ $1.8314 \times 10^{-3}$ $C_8$ $-1.1039 \times 10^{-4}$
$C_{10}$ $-1.1283 \times 10^{-4}$ FFS②
$C_4$ $1.6233 \times 10^{-2}$ $C_6$ $1.1188 \times 10^{-2}$ $C_8$ $-1.7734 \times 10^{-4}$
$C_{10}$ $-3.6309 \times 10^{-4}$ FFS③
$C_4$ $-1.8291 \times 10^{-2}$ $C_6$ $-3.0548 \times 10^{-2}$ $C_8$ $-2.9267 \times 10^{-4}$
$C_{10}$ $-8.9225 \times 10^{-4}$ FFS④
$C_4$ $1.9434 \times 10^{-3}$ $C_6$ $-1.5503 \times 10^{-3}$ $C_8$ $5.2336 \times 10^{-4}$
$C_{10}$ $1.5073 \times 10^{-4}$ FFS⑤
$C_4$ $-6.9987 \times 10^{-3}$ $C_6$ $-1.7664 \times 10^{-3}$ $C_8$ $5.9288 \times 10^{-4}$
$C_{10}$ $1.1033 \times 10^{-4}$ FFS⑥
$C_4$ $3.3010 \times 10^{-2}$ $C_6$ $3.2646 \times 10^{-2}$ $C_8$ $-2.3816 \times 10^{-5}$
$C_{10}$ $-4.4685 \times 10^{-4}$

| Displacement and tilt (1) | | | | | | |
|---|---|---|---|---|---|---|
| X | 0.00 | Y | 6.31 | Z | 1.17 |
| α | -11.46 | β | 0.00 | γ | 0.00 |

| Displacement and tilt (2) | | | | | | |
|---|---|---|---|---|---|---|
| X | 0.00 | Y | -0.16 | Z | 2.94 |
| α | -38.91 | β | 0.00 | γ | 0.00 |

| Displacement and tilt (3) | | | | | | |
|---|---|---|---|---|---|---|
| X | 0.00 | Y | 11.10 | Z | 4.94 |
| α | 42.26 | β | 0.00 | γ | 0.00 |

| Displacement and tilt (4) | | | | | | |
|---|---|---|---|---|---|---|
| X | 0.00 | Y | 11.10 | Z | 4.94 |
| α | 56.58 | β | 0.00 | γ | 0.00 |

| Displacement and tilt (5) | | | | | | |
|---|---|---|---|---|---|---|
| X | 0.00 | Y | 1.04 | Z | 0.16 |
| α | -8.80 | β | 0.00 | γ | 0.00 |

-continued

| Displacement and tilt (6) | | | | | |
|---|---|---|---|---|---|
| X | 0.00 | Y | −0.09 | Z | 1.76 |
| α | −55.78 | β | 0.00 | γ | 0.00 |
| Displacement and tilt (7) | | | | | |
| X | 0.00 | Y | 3.22 | Z | 2.88 |
| α | −124.90 | β | 0.00 | γ | 0.00 |
| Displacement and tilt (8) | | | | | |
| X | 0.00 | Y | 1.04 | Z | 0.16 |
| α | −8.80 | β | 0.00 | γ | 0.00 |
| Displacement and tilt (9) | | | | | |
| X | 0.00 | Y | −0.49 | Z | 1.18 |
| α | 123.42 | β | 0.00 | γ | 0.00 |

Figure 11:
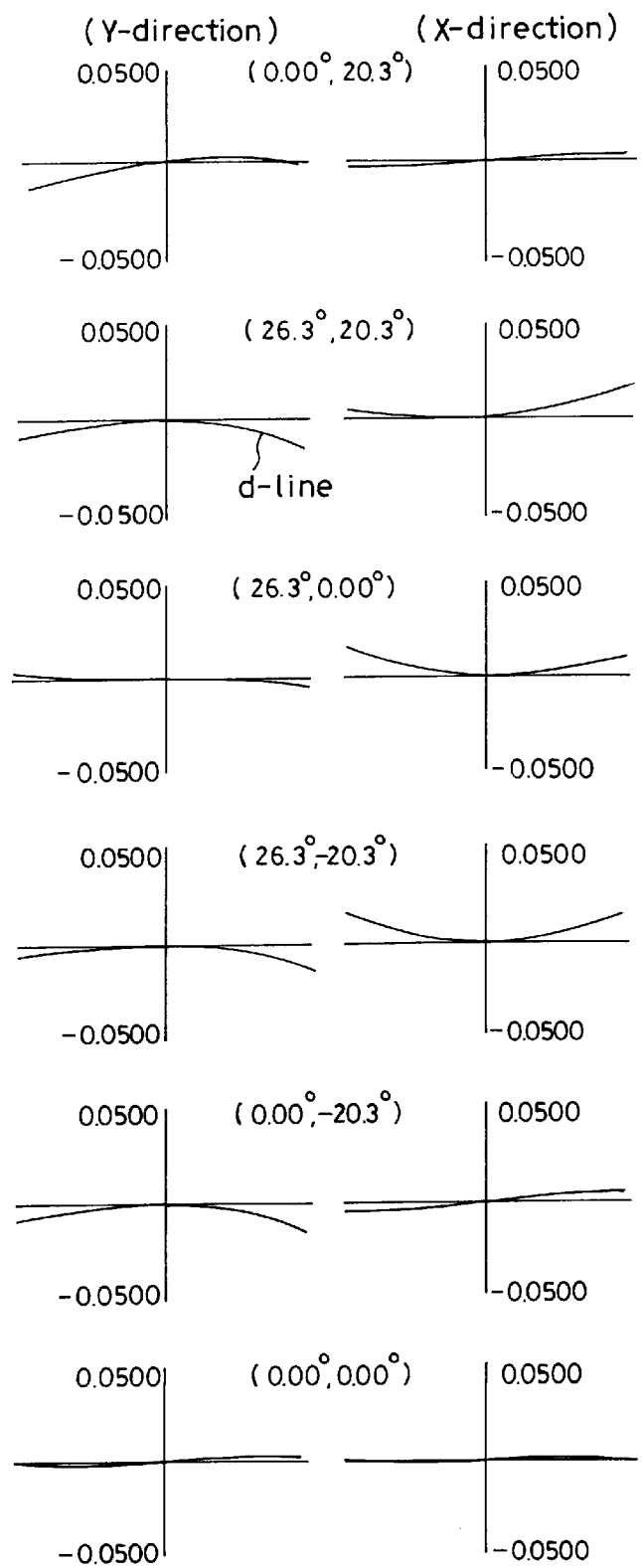
FIG. 11 is an aberrational diagram showing lateral aberrations in the image-forming optical system according to Example 1.

FIG. 11 is an aberrational diagram showing lateral aberrations in the above-described Example 1. In the diagram showing lateral aberrations, the numerals in the parentheses denote [horizontal (X-direction) field angle, vertical (Y-direction) field angle], and lateral aberrations at the field angles are shown.

In the above-described Examples 1 to 10, the second prism 20 that constitutes the image-forming optical system according to the present invention is of the type in which there is one, two or three internal reflections. It should, however, be noted that prisms usable as the second prism 20 in the image-forming optical system according to the present invention are not necessarily limited to the described type. Some examples of prisms usable in the present invention will be described below with reference to FIGS. 17 to 21. In all the following examples, the prisms will be described as a prism P that forms an image on an image plane 36. It should, however, be noted that these prisms are also usable as a prism P in which rays from a subject enter the prism P from the image plane side (36) and an image is formed on the pupil side (31), by reversing the illustrated optical path.

Figure 17:
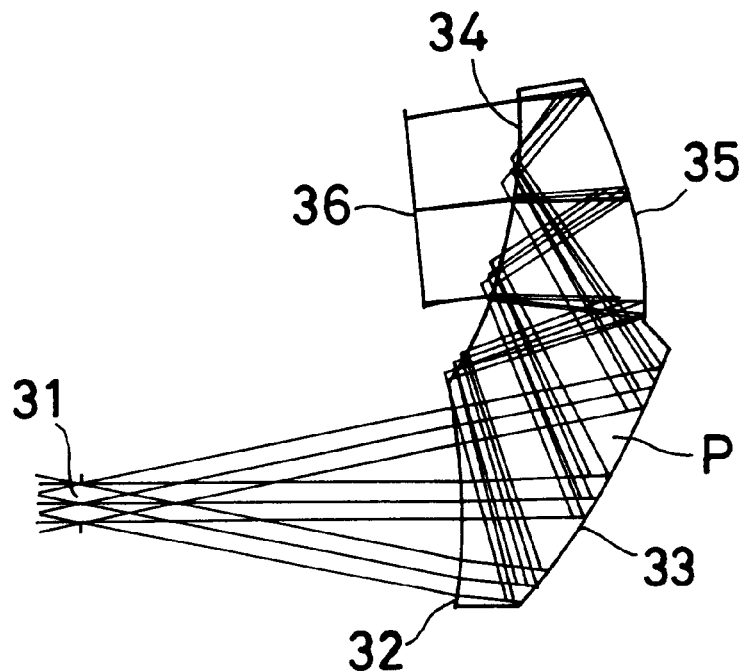
FIG. 17 is a diagram showing one example of decentered prisms applicable to the present invention.

In the case of FIG. 17, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and then totally reflected by the third surface 34. The reflected light is internally reflected by the fourth surface 35 and then refracted by the third surface 34 to form an image on an image plane 36.

Figure 18:
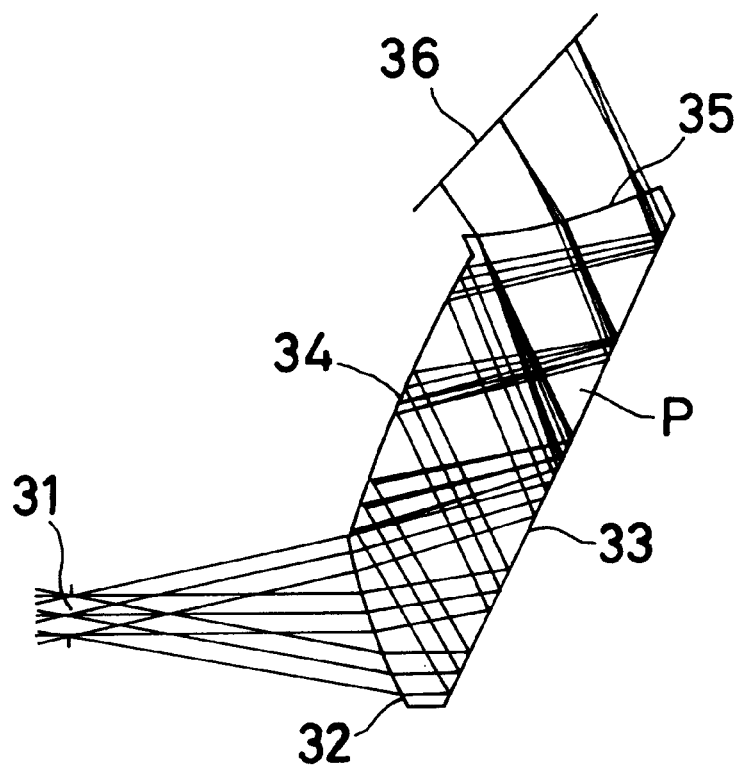
FIG. 18 is a diagram showing another example of decentered prisms applicable to the present invention.

In the case of FIG. 18, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then refracted by the fourth surface 35 to form an image on an image plane 36.

Figure 19:
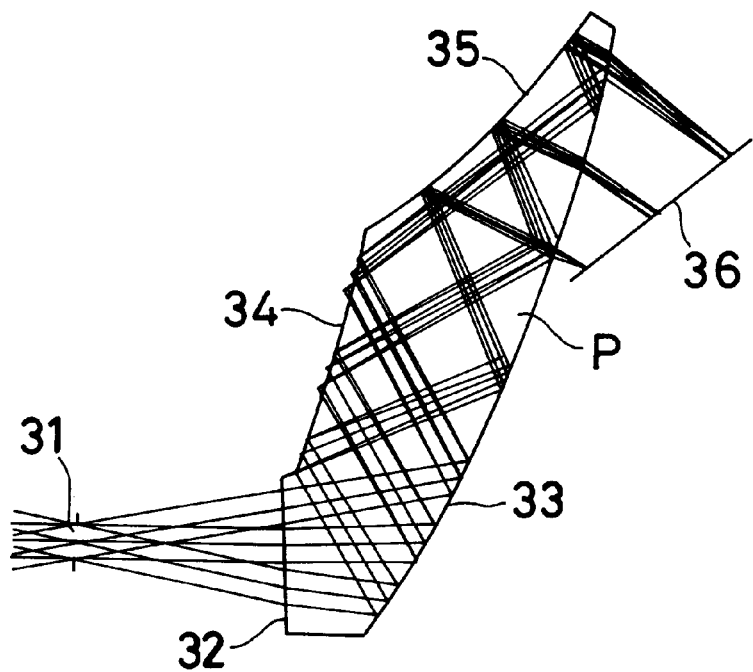
FIG. 19 is a diagram showing another example of decentered prisms applicable to the present invention.

In the case of FIG. 19, a prism P has a first surface 32, a second surface 33, a third surface 34, and a fourth surface 35. Incident light passing through an entrance pupil 31 enters the prism P while being refracted through the first surface 32. The incident light is internally reflected by the second surface 33 and further internally reflected by the third surface 34. The reflected light is further internally reflected by the second surface 33 and then internally reflected by the fourth surface 35. The reflected light is then refracted by the second surface 33 to form an image on an image plane 36.

Figure 20:
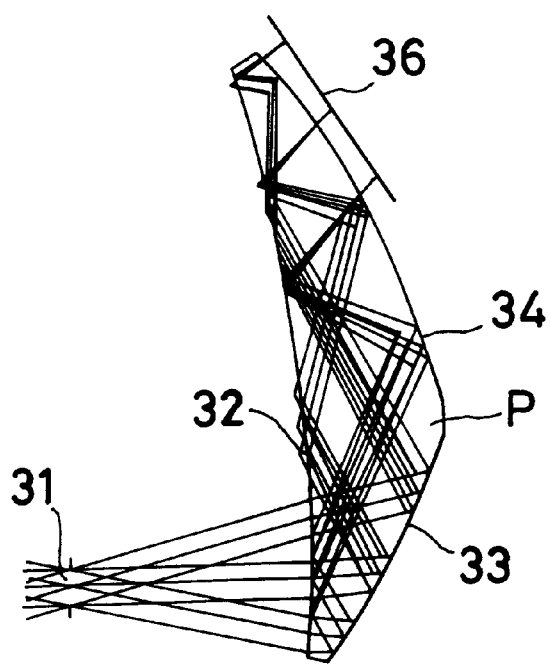
FIG. 20 is a diagram showing another example of decentered prisms applicable to the present invention.

In the case of FIG. 20, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. Then, the reflected light is refracted by the third surface 34 to form an image on an image plane 36.

Figure 21:
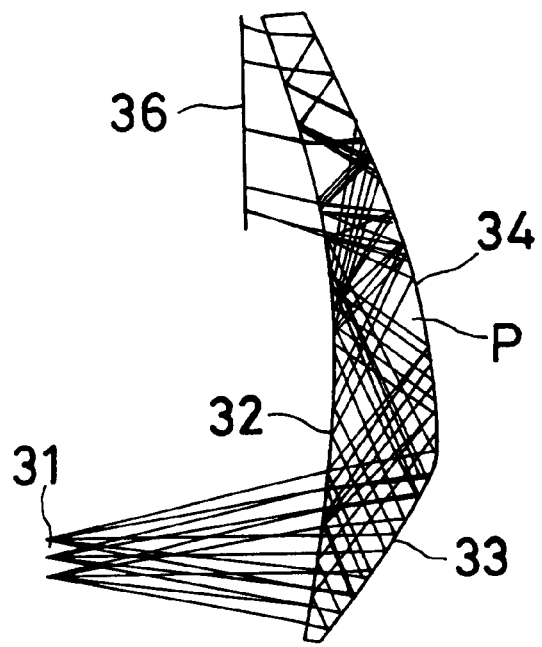
FIG. 21 is a diagram showing another example of decentered prisms applicable to the present invention.
Figure 22:
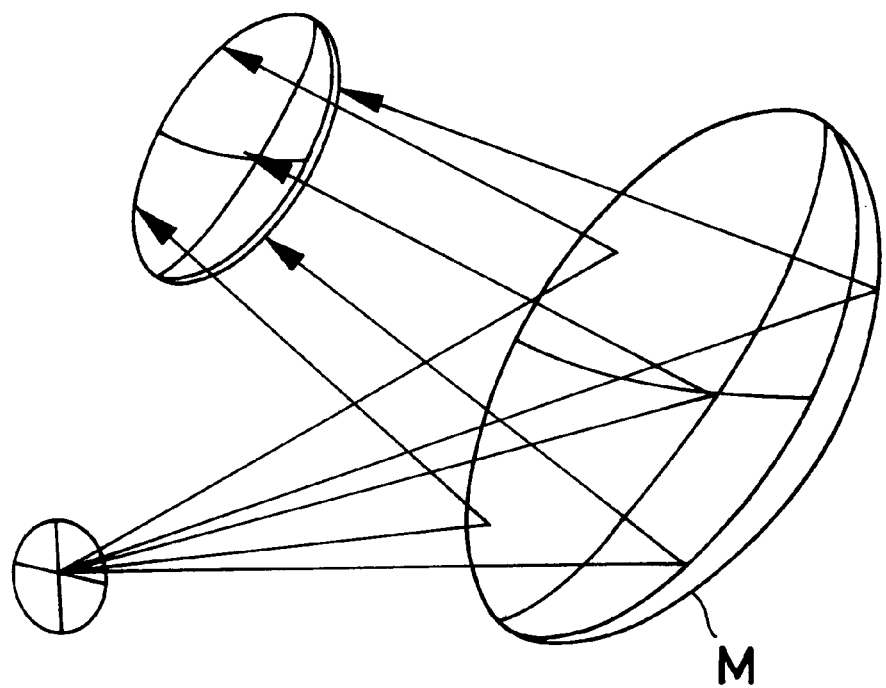
FIG. 22 is a conceptual view for describing curvature of field produced by a decentered reflecting surface.
Figure 23:
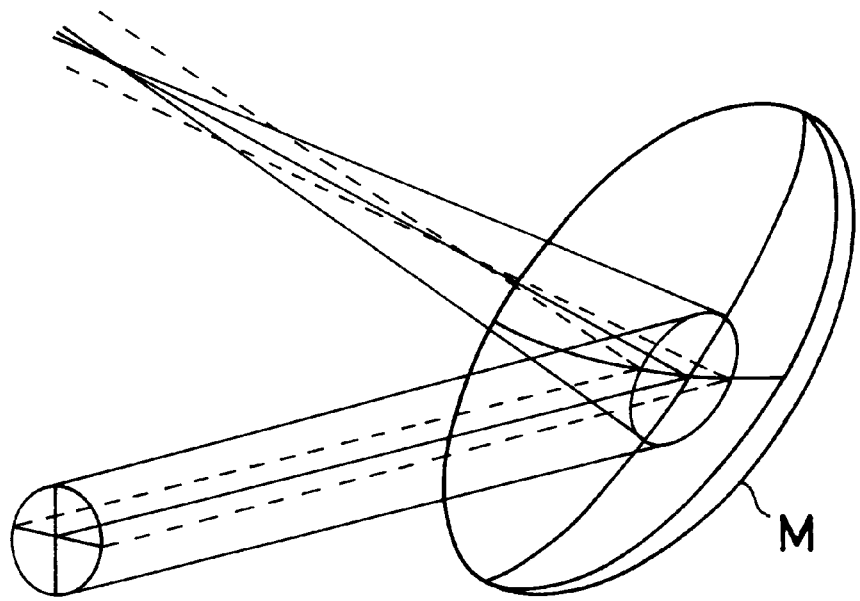
FIG. 23 is a conceptual view for describing astigmatism produced by a decentered reflecting surface.
Figure 24:
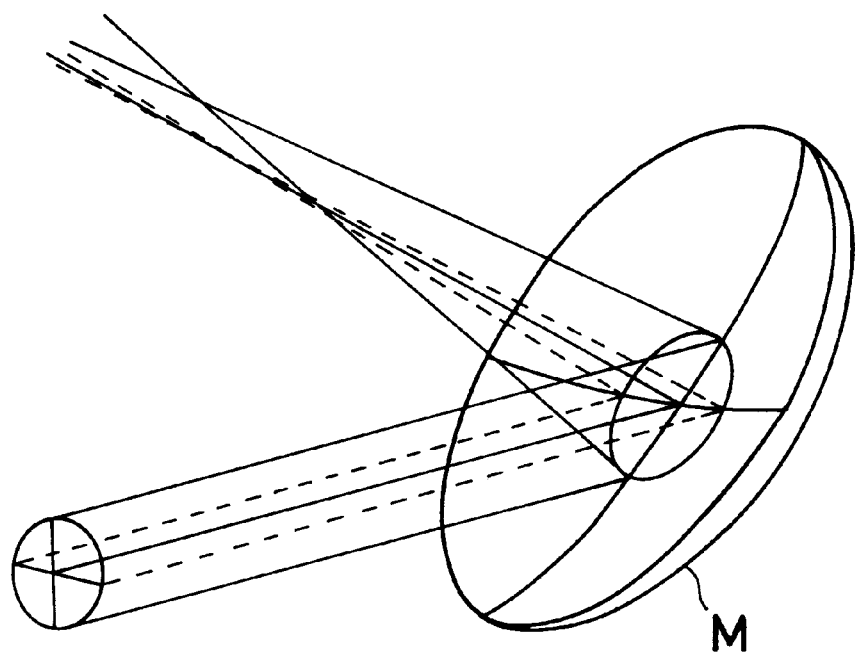
FIG. 24 is a conceptual view for describing coma produced by a decentered reflecting surface.

In the case of FIG. 21, a prism P has a first surface 32, a second surface 33, and a third surface 34. Incident light passing through an entrance pupil 31 enters the prism P while being refracted through the first surface 32. The incident light is internally reflected by the second surface 33 and then totally reflected by the first surface 32. The reflected light is internally reflected by the third surface 34 and then totally reflected by the first surface 32. The reflected light is internally reflected by the third surface 34 and then refracted by the first surface 32 to form an image on an image plane 36.

Incidentally, the above-described image-forming optical system according to the present invention can be used in photographic apparatus, particularly in cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. The image-forming optical system according to the present invention is also usable as an image pickup optical system for optical apparatus using a small-sized image pickup device, e.g. endoscopes. Embodiments in which the present invention is applied to such apparatuses will be described below.

Figure 12:
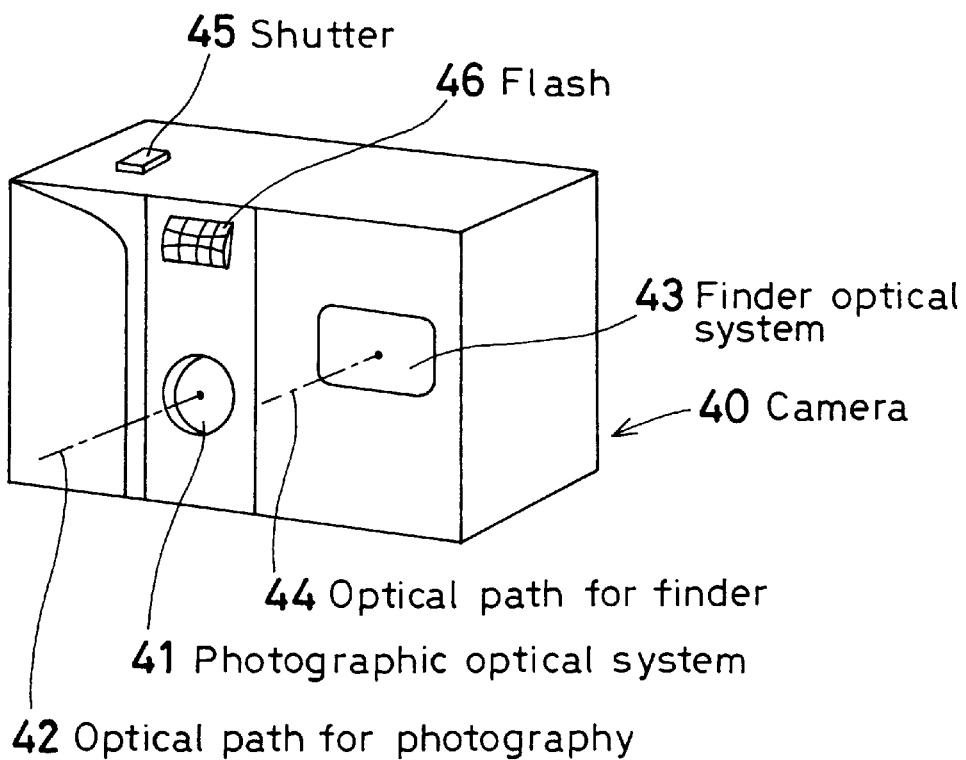
FIG. 12 is a perspective view showing the external appearance of an electronic camera to which an image-forming optical system according to the present invention is applied, as viewed from the front side thereof.
Figure 13:
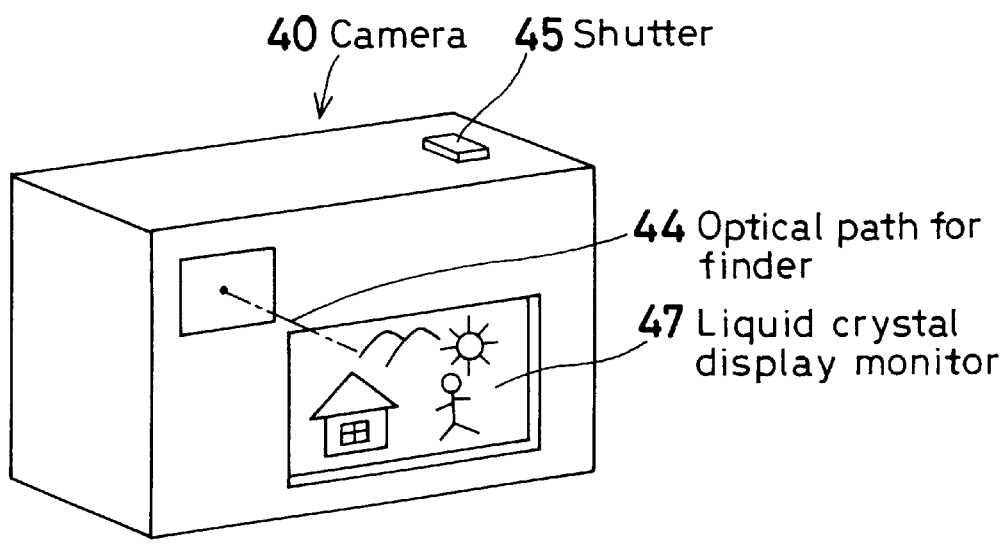
FIG. 13 is a perspective view of the electronic camera shown in FIG. 12, as viewed from the rear side thereof.
Figure 14:
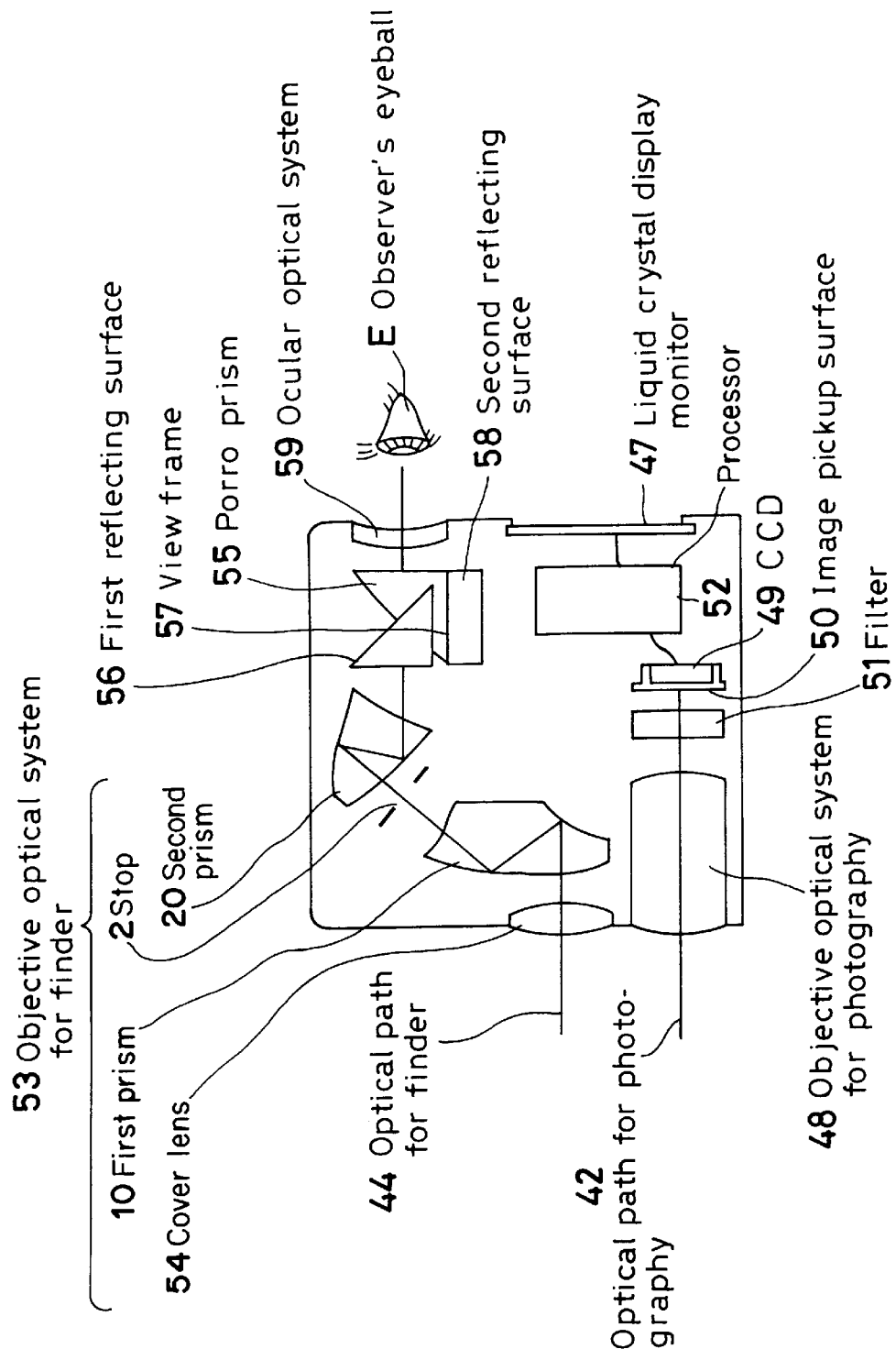
FIG. 14 is a sectional view showing the arrangement of the electronic camera in FIG. 12.

FIGS. 12 to 14 are conceptual views showing an arrangement in which the image-forming optical system according to the present invention is incorporated into an objective optical system of a finder unit of an electronic camera. FIG. 12 is a perspective view showing the external appearance of an electronic camera 40 as viewed from the front side thereof. FIG. 13 is a perspective view of the electronic camera 40 as viewed from the rear side thereof. FIG. 14 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an image-forming optical system similar to Example 1, by way of example, is placed in the optical path 44 for the finder as an objective optical system 53 for the finder. In this case, a cover lens 54 having a positive power is provided as a cover member to form a part of the objective optical system 53, thereby enlarging the field angle. It should be noted that the cover lens 54 and the prism 10 of the image-forming optical system, which is closer to the object side than the stop 2, constitute a front unit of the objective optical system 53 for the finder. The prism 20 of the image-forming optical system, which is closer to the image side than the stop 2, constitutes a rear unit of the objective optical system 53 for the finder. An object image produced by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 14, it should be noted that the objective optical system 48 for photography may be formed by using not only a refracting coaxial optical system but also any of the image-forming optical systems, which comprises two prisms 10 and 20, according to the present invention.

Figure 15:
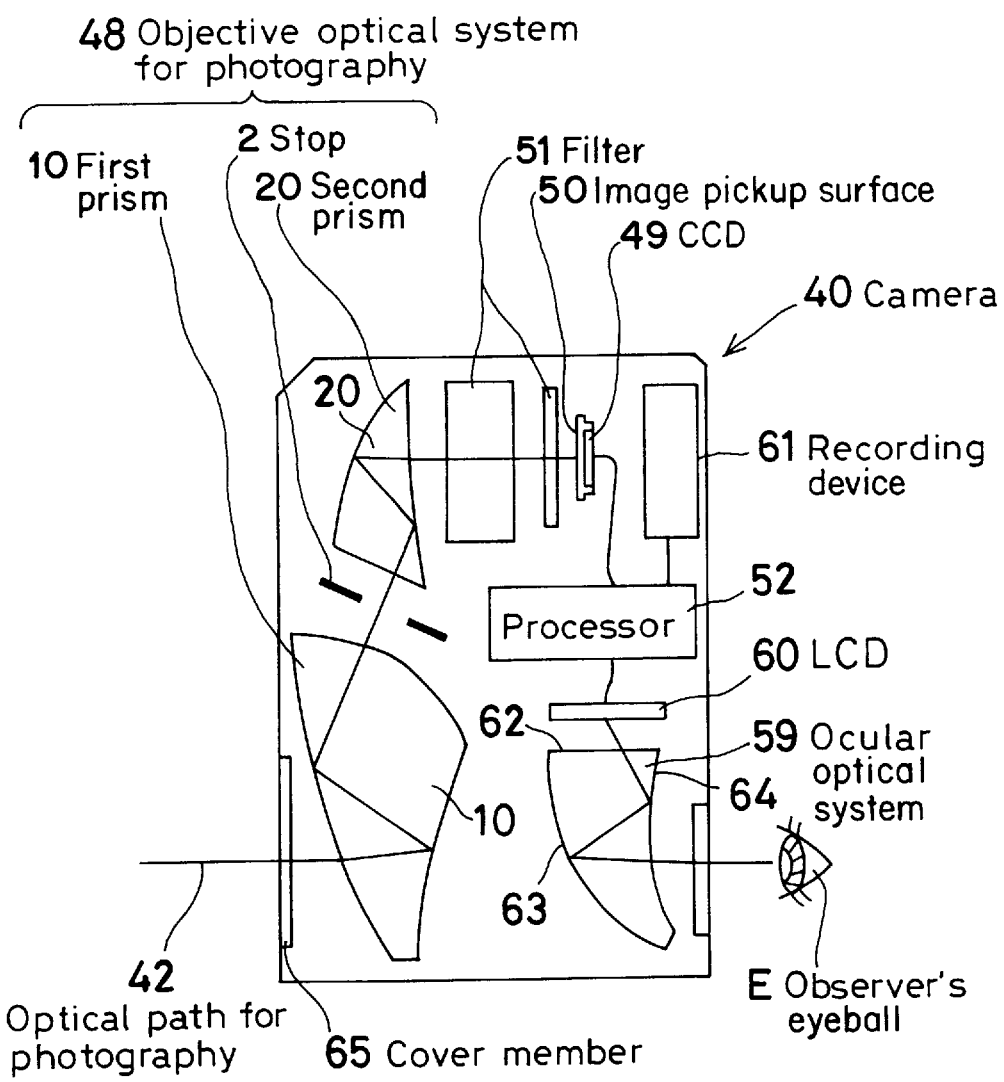
FIG. 15 is a conceptual view of another electronic camera to which an image-forming optical system according to the present invention is applied.

FIG. 15 is a conceptual view showing an arrangement in which an image-forming optical system according to the present invention is incorporated into an objective optical system 48 in a photography part of an electronic camera 40. In this example, an image-forming optical system similar to Example 4 is used in the objective optical system 48 for photography, which is placed in an optical path 42 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism having a configuration similar to that used in the image-forming optical system according to the present invention. In this example, the ocular optical system 59 has three surfaces, i.e. an entrance surface 62, a reflecting surface 63, and a surface 64 serving as both reflecting and refracting surfaces. At least one of the two reflecting surfaces 63 and 64, preferably each of them, is formed from a plane-symmetry free-form surface with only one plane of symmetry that gives a power to a light beam and corrects aberrations due to decentration. The only one plane of symmetry is formed in approximately the same plane as the only one plane of symmetry of the plane-symmetry free-form surfaces in the prisms 10 and 20 provided in the objective optical system 48 for photography. The objective optical system 48 for photography may include another lens (positive or negative lens) as a constituent element at a position on the object side of the two prisms 10 and 20, a position therebetween, or a position on the image side of the two prisms 10 and 20.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

The surface closest to the object side in the image-forming optical system according to the present invention may be used as a cover member instead of providing a cover member separately. In this example, the entrance surface of the prism 10 is the closest to the object side in the image-forming optical system. In such a case, however, because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 16:
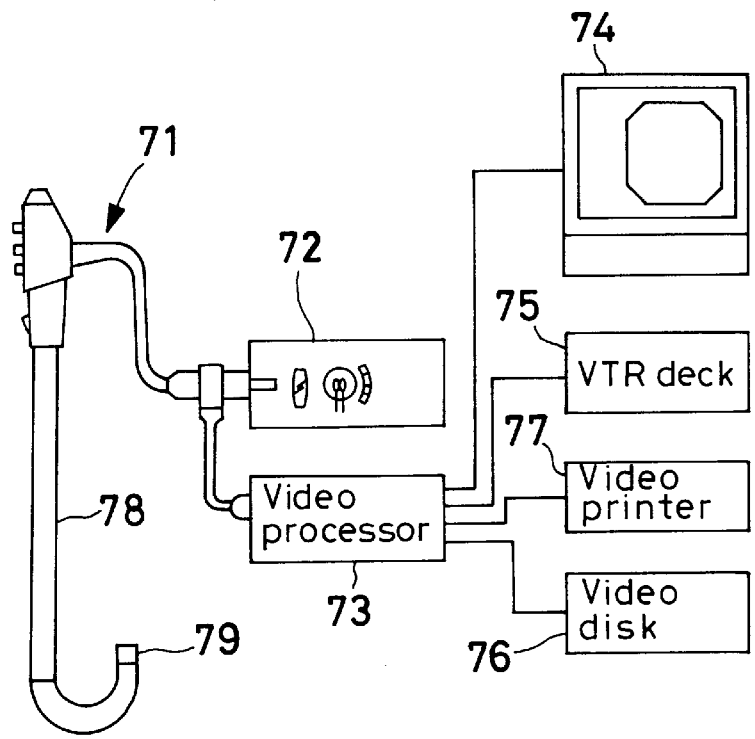
FIG. 16 is a conceptual view of a video endoscope system to which an image-forming optical system according to the present invention is applied.
Figure 16:
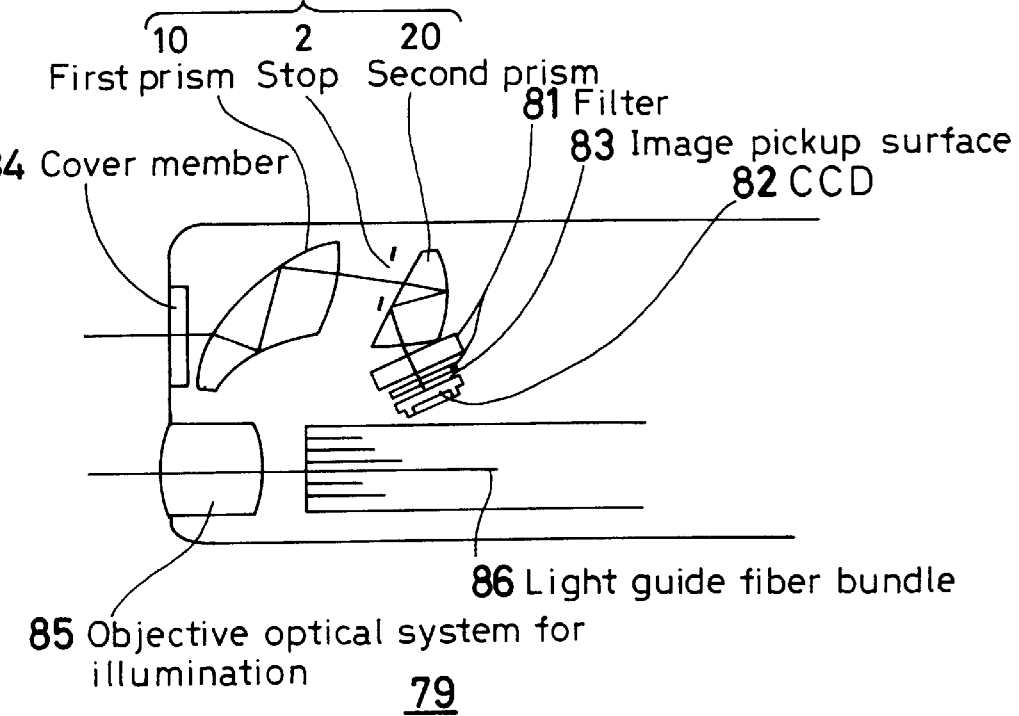

FIG. 16 is a conceptual view showing an arrangement in which an image-forming optical system according to the present invention is incorporated into an objective optical system 80 in an observation system of a video endoscope system. In this case, the objective optical system 80 in the observation system uses the image-forming optical system shown in Example 1. As shown in part (a) of FIG. 16, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope 71 has an insert part 78 with a distal end portion 79. The distal end portion 79 is arranged as shown in part (b) of FIG. 16. A light beam from the light source unit 72 passes through a light guide fiber bundle 86 and illuminates a part to be observed through an objective optical system 85 for illumination. Light from the part to be observed enters an objective optical system 80 for observation through a cover member 84. Thus, an object image is formed by the objective optical system 80. The object image is formed on an image pickup surface 83 of a CCD 82 through a filter 81, e.g. a low-pass filter or an infrared cutoff filter. Furthermore, the object image is converted into a video signal by the CCD 82. The video signal is displayed directly on the monitor 74 by the video processor 73, which is shown in part (a) of FIG. 16. In addition, the video signal is recorded in the VTR deck 75 and on the video disk 76 and also printed out in the form of an image from the video printer 77.

The endoscope arranged as stated above can be constructed with a minimal number of optical members. Accordingly, a high-performance and low-cost endoscope can be realized. Moreover, because the two prism 10 and 20, which constitute the objective optical system 80 of the observation system, are arranged in series in the direction of the longitudinal axis of the endoscope, the above-described advantageous effects can be obtained without hindering the achievement of a reduction in the diameter of the endoscope.

Figure 25:
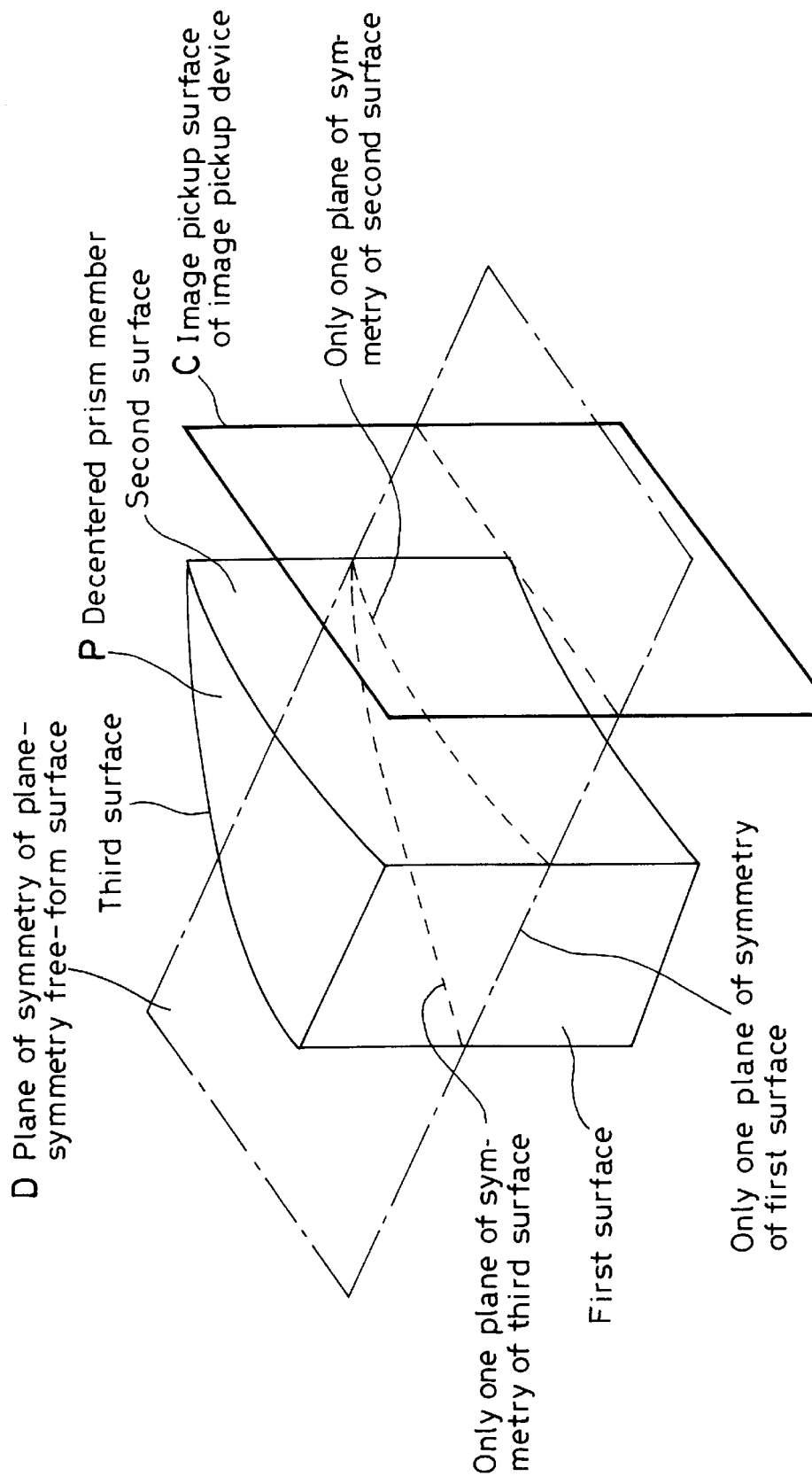
FIG. 25 is a diagram showing a desirable arrangement for an image-forming optical system according to the present invention when it is placed in front of an image pickup device.

FIG. 25 is a diagram showing a desirable arrangement for the image-forming optical system according to the present invention when the image-forming optical system is placed in front of an image pickup device, e.g. a CCD, or a filter. In the figure, a decentered prism P is a prism included in the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus, and is useful for mass-production.

When a plurality or all of the optical surfaces constituting the decentered prism P, i.e. the first surface, the second surface, the third surface, and so forth, are plane-symmetry free-form surfaces, it is desirable from the viewpoint of design and aberration correcting performance to arrange the decentered prism P so that the planes of symmetry of the plurality or all of the optical surfaces are in the same plane D. In addition, it is desirable that the plane D of symmetry and the image pickup surface C should be in the above-described relationship.

As will be clear from the foregoing description, the present invention makes it possible to obtain a high-performance and low-cost image-forming optical system with a minimal number of constituent optical elements. In addition, it is possible to obtain a high-performance image-forming optical system that is made compact and thin by folding an optical path using reflecting surfaces arranged to minimize the number of reflections.

What is claimed is:

1. An image-forming optical system having a positive refracting power as a whole for forming an object image, said image-forming optical system comprising:

a first prism and a second prism, each of said first prism and second prism being formed from a medium having a refractive index (n) larger than 1.3 (n>1.3), said second prism being placed at a position on an image side of said first prism, in an optical path exiting said first prism and intersecting a plane where said object image is formed, wherein an intermediate image is not formed, said first prism having three optical surfaces said three optical surfaces comprising:

a first surface through which a light beam from an object enters said first prism;

a second surface that reflects the light beam entering through said first surface in said first prism;

said first surface further reflecting the light beam reflected by said second surface in said first prism; and a third surface through which the light beam reflected by said first surface exits from said first prism;

wherein at least one of said first surface and said second surface has a curved surface having a power;

said curved surface having a rotationally asymmetric surface configuration that corrects aberrations due to decentration;

said second prism having at least one reflecting surface, said reflecting surface having a rotationally asymmetric surface configuration having a power and correcting aberrations due to decentration.

2. An image-forming optical system according to claim 1, wherein both said first surface and said second surface of said first prism have a rotationally asymmetric surface configuration having a power and correcting aberrations due to decentration.

3. An image-forming optical system according to claim 1, wherein the rotationally asymmetric surface configuration of at least one of said first surface and said second surface of said first prism is a plane-symmetry free-form surface having only one plane of symmetry.

4. An image-forming optical system according to claim 2, wherein the rotationally asymmetric surface configurations of both said first surface and said second surface of said first prism are plane-symmetry free-form surfaces each having only one plane of symmetry.

5. An image-forming optical system according to claim 4, wherein the only one plane of symmetry of the plane-symmetry free-form surface that forms the first surface of said first prism and the only one plane of symmetry of the plane-symmetry free-form surface that forms the second surface of said first prism are in a same plane.

6. An image-forming optical according to any one of claims 1 to 5, wherein the third surface of said first prism has a rotationally asymmetric surface configuration having a power and correcting aberrations due to decentration.

7. An image-forming optical system according to claim 6, wherein the rotationally asymmetric surface configuration of the third surface of said first prism is a plane-symmetry free-form surface having only one plane of symmetry.

8. An image-forming optical system according to any one of claims 1 to 5, wherein the rotationally asymmetric surface configuration provided in said second prism is a plane-symmetry free-form surface having only one plane of symmetry.

9. An image-forming optical system according to claim 8, wherein at least one surface of said first prism has a plane-symmetry free-form surface having only one plane of symmetry and at least one surface of said second prism has a plane-symmetry free-form surface having only one plane of symmetry, wherein the only one plane of symmetry of said plane-symmetry free-form surface in said first prism and the only one plane of symmetry of said plane-symmetry free-form surface in said second prism are in a same plane.

10. An image-forming optical system according to any one of claims 1 to 5, wherein a pupil is placed between said first prism and said second prism, and said second prism is placed between said pupil and an image plane.

11. An image-forming optical system according to claim 10, wherein a stop is placed on said pupil.

12. An image-forming optical system according to any one of claims 1 to 5, wherein said second prism has at least two reflecting surfaces each having a curved surface configuration having a power.

13. An image-forming optical system according to any one of claims 1 to 5, wherein said second prism has three optical surfaces, comprising an entrance surface serving as both a reflecting surface and a transmitting surface, a reflecting surface, and an exit surface.

14. An image-forming optical system according to any one of claims 1 to 5, wherein said second prism has three optical surfaces, comprising a reflecting surface that gives a power to a light beam, an entrance surface, and an exit surface.

15. An image-forming optical system according to any one of claims 1 to 5, wherein said second prism has four optical surfaces, comprising two reflecting surfaces that give a power to a light beam, an entrance surface, and an exit surface.

16. An image-forming optical system according to any one of claims 1 to 5, wherein said second prism has three optical surfaces, comprising an entrance surface, an exit surface serving as both a reflecting surface and a transmitting surface, and a reflecting surface that gives a power to a light beam.

17. An image-forming optical system according to any one of claims 1 to 5, wherein said second prism has three reflecting surfaces, wherein one of said reflecting surfaces also serves as a transmitting surface to form an entrance surface, and another of said reflecting surfaces also serves as a transmitting surface to form an exit surface.

18. A finder optical system comprising:
   an image-forming optical system of any one of claims 1 to 5, said image-forming optical system being provided as a finder objective optical system;
   an image-inverting optical system for erecting an object image formed by said finder objective optical system; and
   an ocular optical system.

19. A camera apparatus comprising:
a finder optical system according to claim 18; and
an objective optical system for photography provided in parallel to said finder optical system.

20. An image pickup optical system comprising:
an image-forming optical system according to any one of claims 1 to 5; and
an image pickup device placed in an image plane formed by said image-forming optical system.

21. A camera apparatus comprising:
an image-forming optical system according to any one of claims 1 to 5, said image-forming optical system being provided as an objective optical system for photography; and
a finder optical system placed in one of an optical path separate from an optical path of said objective optical system for photography and an optical path branched from the optical path of said object optical system for photography.

22. An electronic camera apparatus comprising:
an image-forming optical system according to any one of claims 1 to 5;
an image pickup device placed in an image plane formed by said image-forming optical system;
a recording medium to record image information received by said image pickup device; and
an image display device that receives image information from one of said recording medium and said image pickup device to form an image for observation.

23. An endoscope system comprising:
an observation system having a image-forming optical system according to any one of claims 1 to 5 and an image transmitting member for transmitting an image formed by said image-forming optical system along a longitudinal axis; and
an illumination system having an illuminating light source and an illuminating light transmitting member for transmitting illuminating light from said illuminating light source along the longitudinal axis.

* * * * *